US012341620B2

(12) United States Patent
Prasad

(10) Patent No.: US 12,341,620 B2
(45) Date of Patent: *Jun. 24, 2025

(54) PARTICIPANT INTERACTIONS DURING A VIRTUAL EXPO

(71) Applicant: Zoom Video Communications, Inc., San Jose, CA (US)

(72) Inventor: Pankaj Kumar Prasad, San Francisco, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/405,332

(22) Filed: Jan. 5, 2024

(65) Prior Publication Data

US 2024/0146561 A1    May 2, 2024

Related U.S. Application Data

(63) Continuation of application No. 17/582,830, filed on Jan. 24, 2022, now Pat. No. 11,870,598.

(51) Int. Cl.
*H04L 12/18* (2006.01)
*H04N 7/15* (2006.01)

(52) U.S. Cl.
CPC ...... *H04L 12/1822* (2013.01); *H04L 12/1831* (2013.01); *H04N 7/152* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 9,106,794 B2 * | 8/2015 | Jones | |
| 10,740,124 B1 | 8/2020 | Campbell, III et al. | |
| 11,706,264 B2 * | 7/2021 | Powell | |
| 11,095,857 B1 | 8/2021 | Krol et al. | |
| 11,184,362 B1 | 11/2021 | Krol et al. | |

(Continued)

FOREIGN PATENT DOCUMENTS

| | | |
|---|---|---|
| KR | 102219367 B1 | 2/2021 |
| WO | 2022086954 A1 | 4/2022 |

OTHER PUBLICATIONS

PCT App. No. PCT/US2023/011026, "International Search Report and Written Opinion", May 10, 2023, 10 pages.

*Primary Examiner* — Phyllis A Book
(74) *Attorney, Agent, or Firm* — Kilpatrick Townsend & Stockton LLP

(57) ABSTRACT

Example systems and methods for facilitating participant interactions during a virtual expo are provided. A video conference provider creates a virtual expo. The video conference provider receives, from a first client device associated with a first participant in the virtual expo, a request to interact with a second participant in the virtual expo. The video conference provider provides, to a second client device associated with the second participant, a notification of the request to interact. The video conference provider receives, from the second client device, an approval of the request. In response to receiving the approval, the video conference provider establishes a first virtual interaction session between the first participant and the second participant.

20 Claims, 18 Drawing Sheets

(56) References Cited

U.S. PATENT DOCUMENTS

| | | |
|---|---|---|
| 11,323,540 B1* | 5/2022 | Klein |
| 11,362,848 B1* | 6/2022 | Lin |
| 11,475,635 B1 | 10/2022 | Boufarhat |
| 11,489,684 B2* | 11/2022 | Lin |
| 11,722,535 B2* | 8/2023 | Lin |
| 2009/0254843 A1 | 10/2009 | Van Wie et al. |
| 2013/0117704 A1* | 5/2013 | Lahoutifard |
| 2013/0275886 A1 | 10/2013 | Haswell et al. |
| 2014/0267564 A1 | 9/2014 | Pourashraf et al. |
| 2018/0041554 A1* | 2/2018 | Yellamraju |
| 2018/0198831 A1 | 7/2018 | Calcaterra et al. |
| 2019/0356709 A1 | 11/2019 | Zlatarev |
| 2021/0319403 A1 | 10/2021 | Platt et al. |
| 2021/0352120 A1 | 11/2021 | Masi et al. |
| 2022/0172415 A1 | 6/2022 | Oetting et al. |
| 2022/0201051 A1* | 6/2022 | Ashkenazi |
| 2022/0321370 A1 | 10/2022 | Skuratowicz et al. |
| 2022/0321373 A1 | 10/2022 | Lin et al. |
| 2022/0321617 A1* | 10/2022 | Gale |
| 2022/0321832 A1* | 10/2022 | Lin |

* cited by examiner

PARTICIPANT INTERACTIONS DURING A VIRTUAL EXPO

RELATED APPLICATIONS

The present application is a continuation of U.S. application Ser. No. 17/582,830 filed Jan. 24, 2022, entitled, "PARTICIPANT INTERACTIONS DURING A VIRTUAL EXPO," the entirety of which is incorporated by reference herein.

FIELD

The present application generally relates to video conferences and more particularly relates to participant interactions during a virtual expo.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
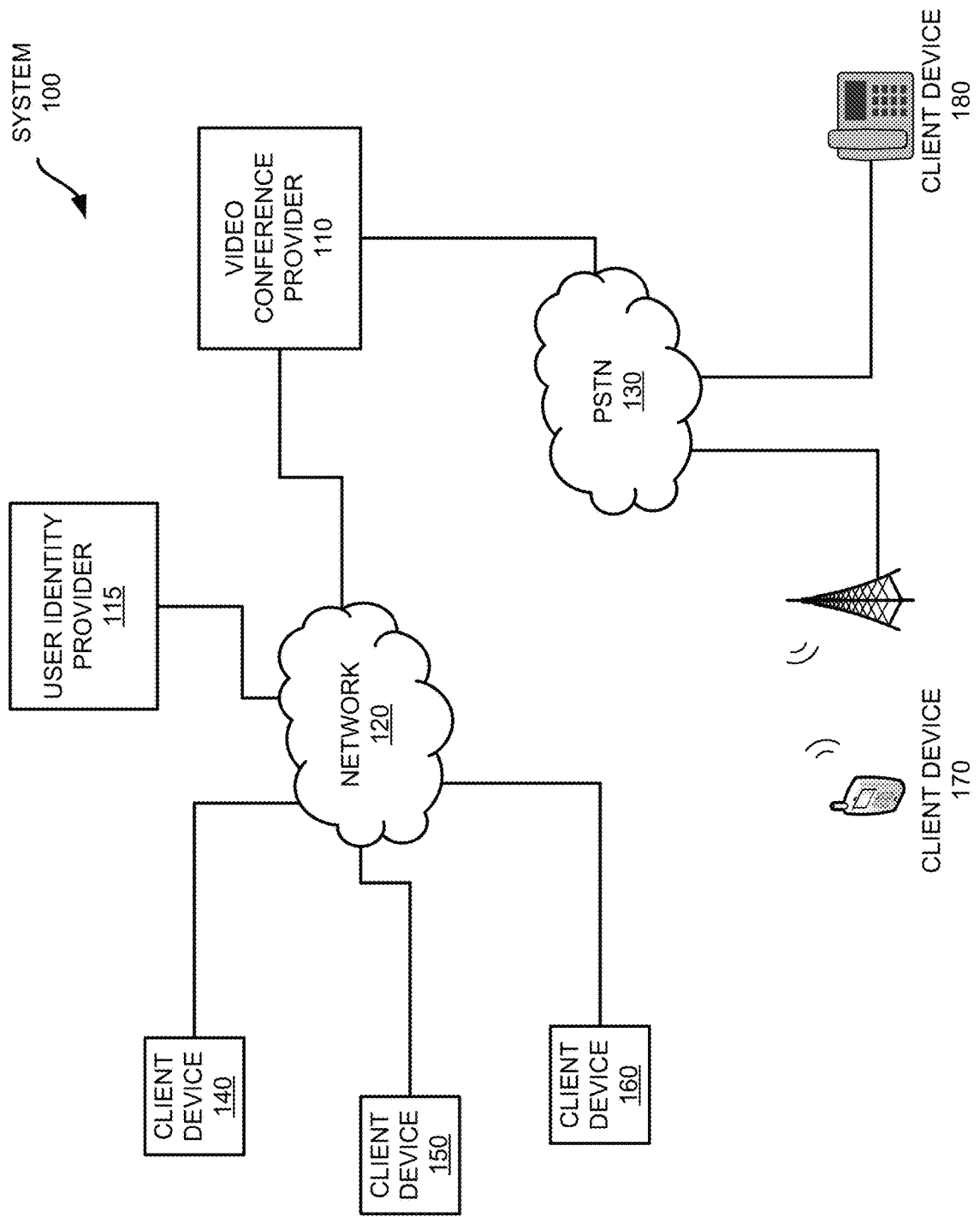
FIGS. 1-3 show example systems for participant interactions during a virtual expo.

Examples are described herein in the context of participant interactions during a virtual expo. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable users to host, join, and participate in video conference meetings with one or more other participants. In addition, a video conference provider can provide virtual conference experiences, such as a virtual expo (or "expo") that provides a virtual expo space in which one or more virtual expo booths may be arrayed. The virtual expo booths may be hosted by sponsors of the virtual expo, by the host of the virtual expo, or by an attendee of the expo. Such virtual expos, or virtual video conference expos, can enable participants to navigate the expo space to visit one or more of the expo booths, view content within the expo booths, or obtain information materials from the expo booths. Further, the expo booths themselves may provide one or more virtual interaction spaces (also referred to as "booth spaces") that participants can select between, as well as virtual "tables" where the participants can access and obtain information materials without entering into a specific booth space. During the expo, participants may join the expo according to their respective level of access, move an avatar within the expo, and interact with expo booths or other participants within the virtual expo.

Once the virtual expo begins, participants may join the virtual expo by using a video conferencing client application (or "software client") on their client devices. The video conference provider receives the requests from the various participants to join the virtual expo, determines whether they are registered (or otherwise authorized to join), creates a virtual avatar for the participant and associates the user's profile with the avatar. The participant's avatar is then positioned within the virtual expo space and information about the virtual expo is provided to the participant's client software, such as the size and shape of the virtual expo floor, the locations and arrangement of virtual expo booths within the virtual expo floor, and the locations of one or more other participants.

In addition, the participant's software client receives information about the locations of other participants in the expo and displays avatars for those participants within the virtual expo space. As the participant navigates the virtual expo space, they may wish to interact with another participant, based on information that may be available to the participant, such as the other participant's name, their company, or one or more interests the other participant has included in their profile. After identifying another participant to interact with, the participant selects the other participant within their software client's graphical user interface ("GUI") and selects an option to join a conversation with the other participant. The video conference provider then provides a notice to the other participant, via their software client, that the participant would like to have a conversation with them. The other participant can then decide whether to join the conversation or decline.

If the other participant elects to join the conversation, the video conference provider can establish a session or a virtual meeting for the two participants to join. The participants can then interact, such as via the virtual meeting, and later end the discussion and leave the meeting, at which time the video conference provider ends the meeting. Such functionality can allow participants in one virtual meeting that provides a virtual expo experience to spontaneously create a second virtual meeting to specifically interact with each other. This can allow many participants to interact with the virtual expo and to control their interactions with other participants. In contrast to a typical virtual meeting, where all of the participants are able to see or hear each other and interact accordingly, in a virtual expo setting, the participants are able to freely navigate the virtual expo to find interesting booths or information and only selectively interact with other participants, and, if they wish, keep the conversation private or allow others to join. This can provide a more interesting expo experience for the participants, where they can both enjoy the expo booths and content, while also engaging in networking conversations or simply having spontaneous conversations about common interests.

This illustrative example is given to introduce the reader to the general subject matter discussed herein and the disclosure is not limited to this example. The following sections describe various additional non-limiting examples and examples of participant interactions during a virtual expo.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
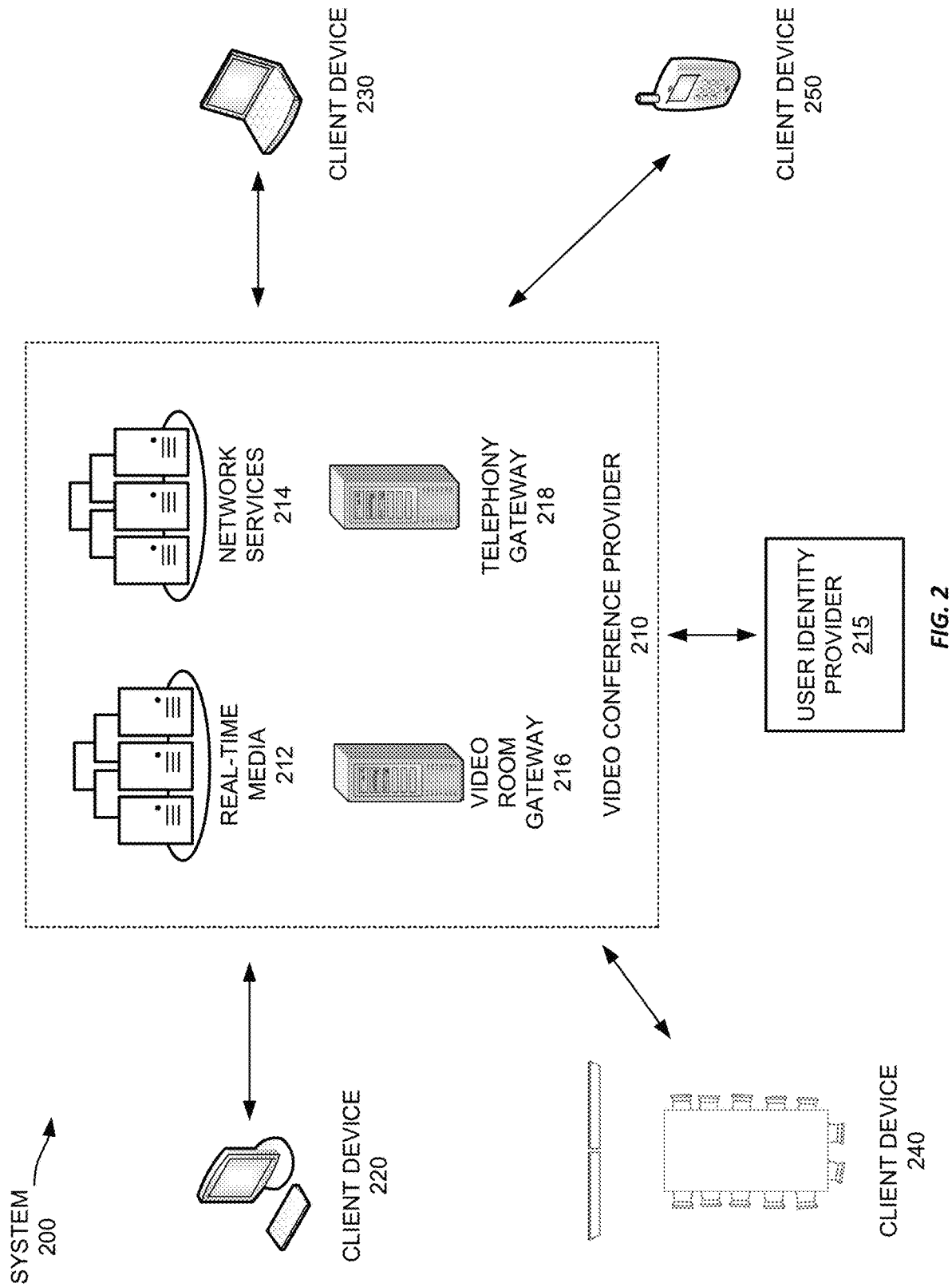

Video conference provider 110 allows clients to create video conference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used. Further, in some examples, and as alluded to above, a meeting may also have "breakout" rooms. Such breakout rooms may also be rooms that are associated with a "main" video conference room. Thus, participants in the main video conference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
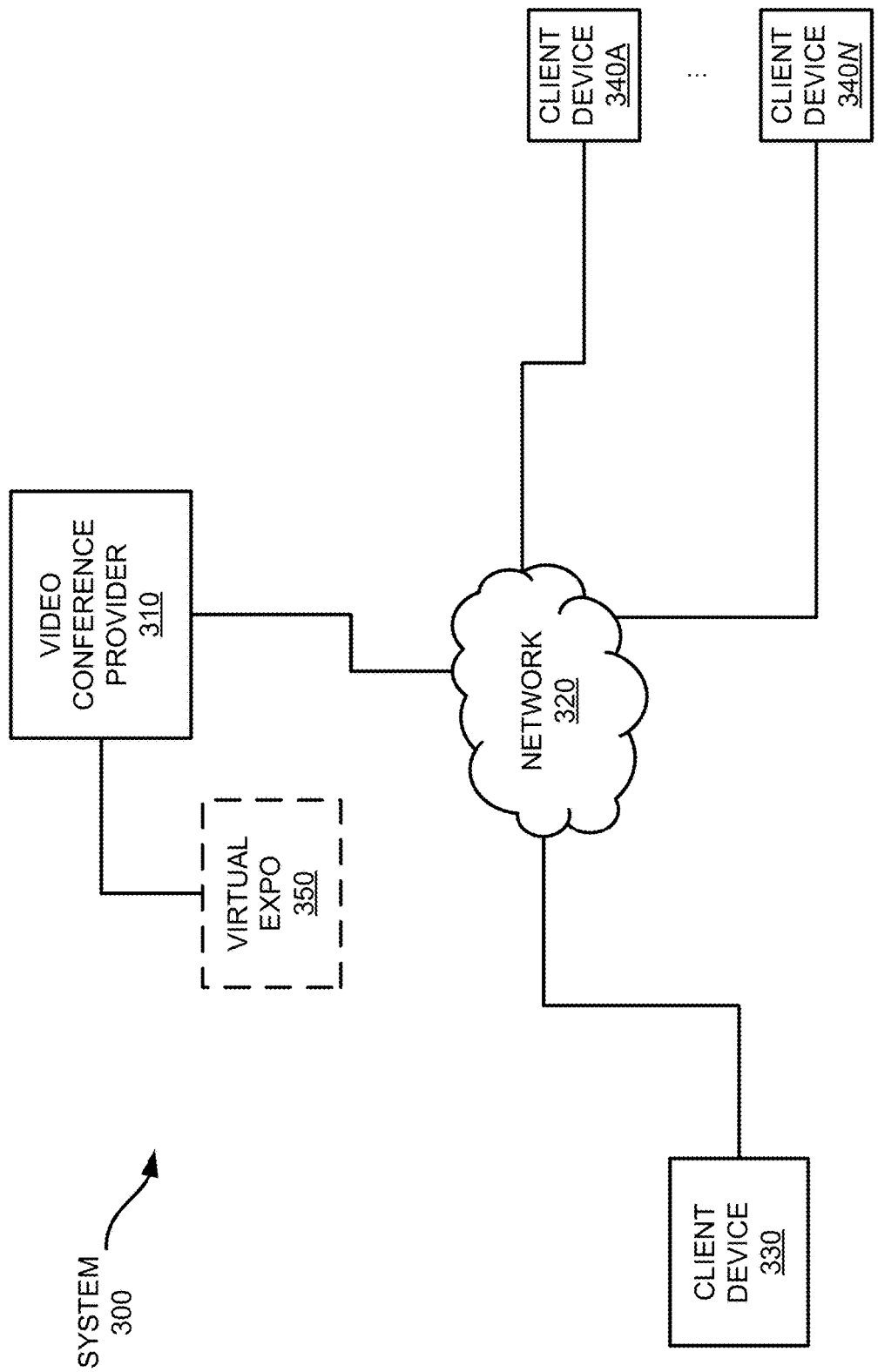

Referring now to FIG. 3, FIG. 3 shows an example system 300 for participant interactions during a virtual expo. In this example, a video conference provider 310, such as the video conference provider 110, 210 in FIG. 1 or 2, is connected to a communications network 320, such as the internet. An expo host client device 330 and a number of participant client devices 340a-n (n representing any number of participant client devices in this example) are also connected to the network 320.

The user of the expo host client device 330, or the "expo host," connects to the video conference provider 310 and creates a new virtual expo. While a single expo host is discussed with respect to this example, any number of users may be expo co-hosts for a virtual expo. The expo host selects an option to create a new virtual expo. After opting to create a new virtual expo, the expo host may then establish initial information about the virtual expo, such as identifying one or more sponsors of the virtual expo, sponsorship levels, a name of the virtual expo, the dates and times during which the virtual expo will be available, various participant access levels for the virtual expo, as well as settings regarding whether the virtual expo will be open or invitation-only.

To establish the virtual expo floor, the expo host selects a configuration for the virtual expo floor, which may include establishing a layout for the expo floor, including locations for individual expo booths, establishing regions with restricted access for participants, establishing regions available for expo booths associated with particular tiers of sponsors, and locations that may only be available to the expo host, such as to meet and coordinate aspects of the virtual expo while it is in session. The layout may be selected from a template or may be arranged manually by the expo host, such as by establishing booth locations and regions as discussed above.

After making these initial selections, the expo host may identify one or more sponsors that will provide booths within the expo. As discussed above, the virtual expo provides a virtual space within which expo participants may move and interact with other expo participants or with expo booths or other content via different video conferences established and maintained during the course of the virtual expo. As will be illustrated in more detail with respect to FIG. 4, the virtual expo provides a video conference experience whereby participants may be presented with a view of the virtual expo floor (which provides a graphical representation of the virtual expo), a view of their own location on the virtual expo floor (such as by an avatar), avatars of other participants on the virtual expo floor, and various expo booths that may be available for access.

In addition to providing a layout for the virtual expo floor, the expo host can establish various access levels, such as sponsorship tiers and participant access levels. Sponsorship tiers may be created and made available to potential exhibitors or presenters for the virtual expo. For example, a virtual expo may be used to provide a virtual industry conference. Sponsorship tiers, such as platinum, gold, silver, and bronze, may be established and available to potential industry sponsors for a corresponding fee. Different sponsorship tiers may enable the corresponding sponsor to establish one or more virtual expo booths within the virtual expo and may enable them to provide differing types of experiences for expo participants.

In addition to establishing sponsors and sponsorship tiers, the expo host may establish participant access levels. Access levels may enable participants to engage with the virtual expo to a greater or lesser extent. The expo host may have "host" level access, which may provide essentially unfettered access to interact with the virtual expo, including access to individual virtual expo booths or booth space, and access to expo participants or sponsors. Lower-level access levels may be assigned to participants, such as based on their association with an expo sponsor, e.g., platinum, gold, or based on purchasing tickets to the expo at different levels. For example, the expo host may offer ticket packages to expo attendees for varying prices. Top-level access may enable participants to access more of the expo booths, have access to sponsors or other expo participants, early access to the virtual expo or access to exclusive content within the expo, such as sneak peeks of new products. Lower levels of access may provide fewer access privileges, including a base level of access, which may be available to unticketed participants, that only provides access to the virtual expo during limited times, only provides access to virtual expo booths in a general admission or public portion of the virtual expo, and limited (if any) ability to interact with other expo participants or within virtual expo booths or booth spaces.

Once the virtual expo is open for registration, users may access the video conference provider 310 and register for the virtual expo 350. As a part of registering, a participant may provide certain information to the video conference provider 310, which may be stored in a profile for the participant. Such information may include the participant's name, contact information, and employer. It may also include information about the participant such as particular topics of interest to the participant, whether the participant is interested in networking with other participants at the virtual expo, and whether the participant would like to be visible to other participants on a graphical representation of the virtual expo. Once a participant has registered for the virtual expo, they may be provided with access information for the virtual expo, such as a link to a video conference for the virtual expo.

When the scheduled time for the virtual expo arrives, the video conference provider 310 begins the virtual expo to host the virtual expo floor. In addition, it may establish other video conferences corresponding to the configured virtual expo booths and at the scheduled times for the respective expo booths. Unlike in a conventional video conference, however, video conferences corresponding to the virtual expo booths (or virtual booth spaces within the video expo booths) may only be accessible via interactions within the virtual expo floor. Thus, a participant may join other video conferences from the virtual expo floor by navigating near a virtual expo booth or by selecting a virtual expo booth to interact with. However, they may not receive any other information that would enable them to access such video conferences, such as a link to the virtual expo booth.

As participants contact the video conference provider 310 to join the virtual expo 350, it may verify their identities with a user identity provider, e.g., user identity providers 115, 215, to determine whether the participant has registered for the virtual expo, and, if so, a corresponding access level for the participant. It may also use participant profile information to determine what information to provide to the participant during the virtual expo. For example, as the participant navigates the virtual expo floor, the video conference provider 310 may provide information about nearby participants on the virtual expo floor, which the participant's client device may display on the graphical representation of the virtual expo floor. However, if one of the nearby participants has elected to remain hidden, the video conference provider may not provide information about the hidden participant to other nearby participants, or it may provide an instruction to not display such participant. However, depending on various participants' access levels, such profile information may be overridden. For example, the expo host may be able to see the location of all participants, regardless of their profile settings.

During the virtual expo, the video conference provider 310 provides information about the virtual expo floor to participants who join the virtual expo. This information may allow the participants' client devices to generate and display a graphical representation of the virtual expo or the information may be a graphical representation created at the video conference provider 310 and provided in video streams to respective participants. However, because different participants will likely be at different locations within the expo, the video conference provider 310 may need to generate different graphical representations suitable for different participants.

In addition to providing the information about the virtual expo floor, the video conference provider 310 also maintains location information for each participant within the virtual expo floor to enable the participants' client devices to display a representation of the participant, e.g., an avatar, at the corresponding location on the graphical representation of the virtual expo floor.

Figure 4:
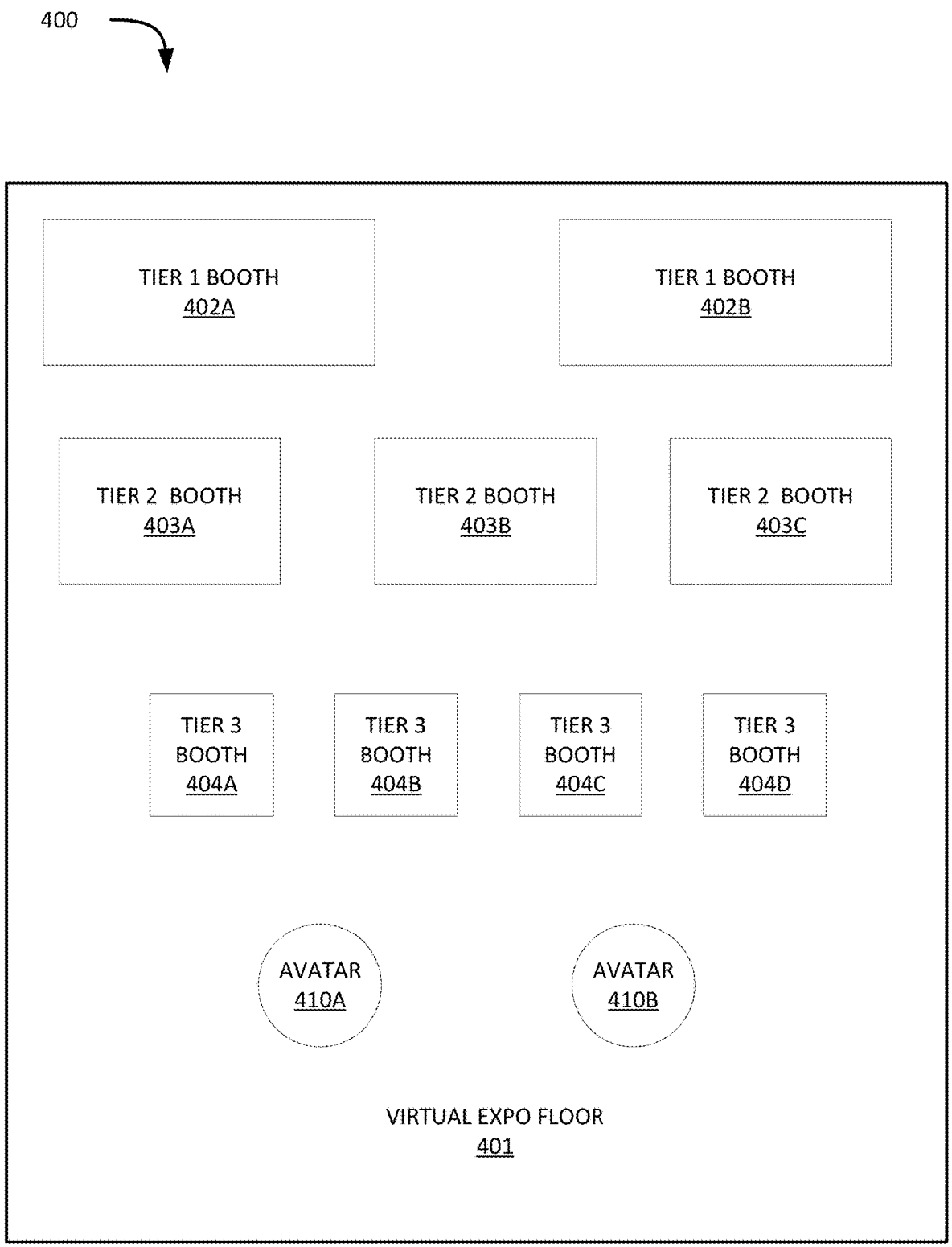
FIG. 4 shows a graphical representation of an example virtual expo.

Referring now to FIG. 4, FIG. 4 illustrates a graphical representation of a virtual expo 400. The virtual expo 400 is described with relation to the systems described in FIG. 3. The virtual expo 400 may include an expo floor 401, one or more tier 1 booth 402*a-b*, one or more tier 2 booths 403*a-c*, and one or more tier 3 booths 404*a-d* (the one or more tiers of booths may be referred to collectively as "booths"). Still further tiers may be used according to different examples.

In addition to the various booths within the expo floor 401, avatars 410*a-b* that represent different participants are also shown and move as the corresponding participant navigates the expo floor 401. Each participant is able to see the avatars of other participants during the virtual expo and, if desired, one participant can request to interact with another participant or multiple participants, which will be discussed in more detail below.

As discussed above, the virtual expo 400 is a video conference, hosted by an expo host via a video conference provider 310. Each booth may in turn be a video conference within the virtual expo 400, hosted by the respective sponsors. During the virtual expo 400, the booths may be available for participants to join at their election, though sponsors may restrict access to the booth or to content within the booth based on different participant access levels or other parameters such as a number of participants already in the booth. And while this example shows a particular arrangement for the booths within the virtual expo floor 401, any suitable arrangement may be employed.

Figure 5:
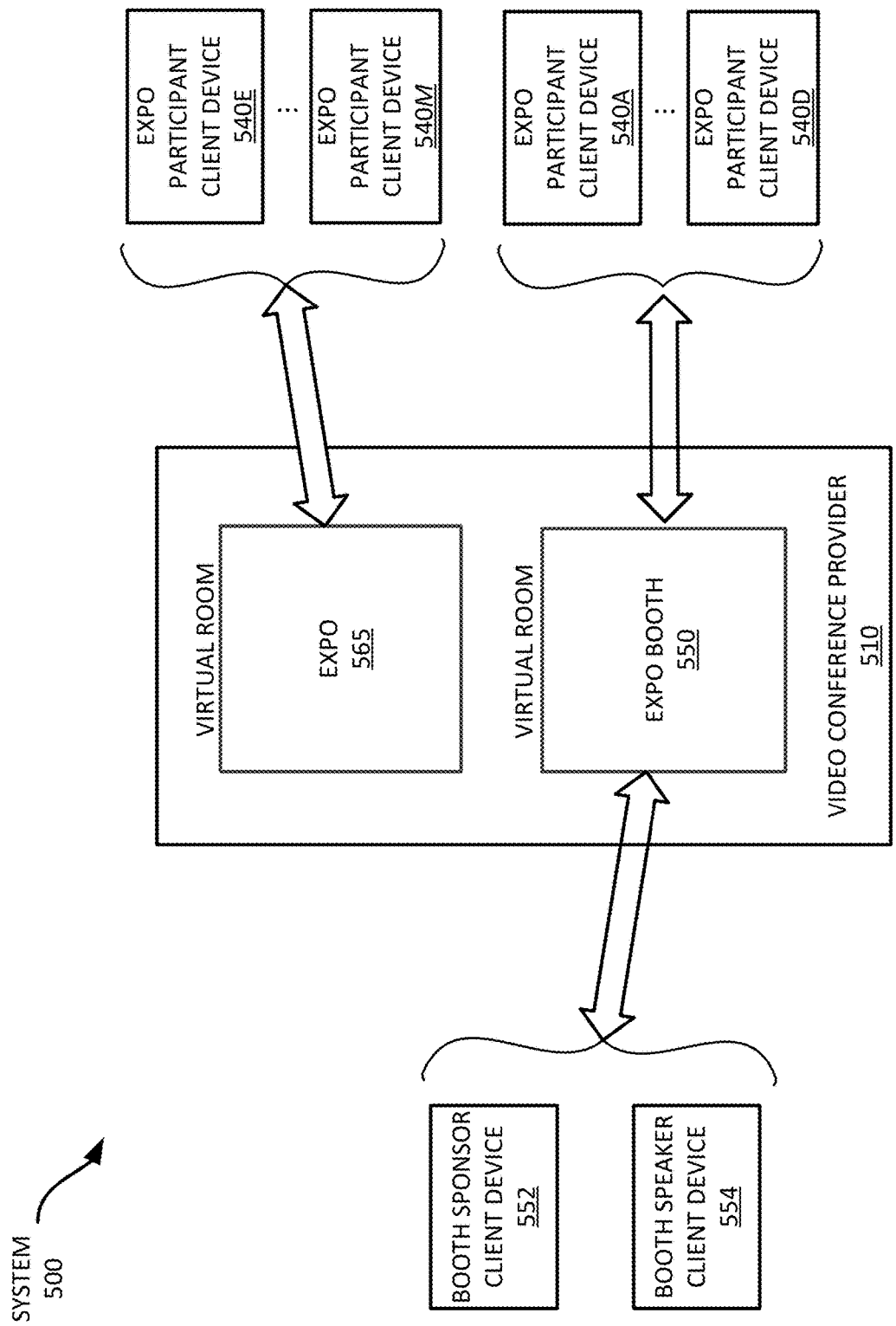
FIG. 5 shows an example system for participant interactions during a virtual expo.

Referring now to FIG. 5, FIG. 5 illustrates an example system 500 for participant interactions during a virtual expo. As discussed above, a virtual expo may include a first video conference, such as a virtual expo floor 565. Video conference provider 510 may also establish the booth 550, in which a participant can experience the second video conference with one or more other participants.

The expo 565 and the booth 550 may be considered virtual "rooms" in which participants of the expo can interact. Expo 565 is a virtual room in which the participants of the expo can interact with each other or with objects within the virtual expo floor, such as virtual expo booths. The booth 550 may be a virtual room in which participants of the expo can enter to virtually interact during the expo 565. As described above, the expo 565 may include more than one booth 550, and the booth 550 may include a booth space (e.g., another virtual room) within the booth 550 itself from which still additional video conferences may be available with various content or participant interactions. A "booth space" provides a further separate virtual meeting within an expo booth within which participants may interact or may avail themselves of other content within the booth space, such as interact with booth sponsors or other booth personnel, one or more available presentations or downloadable documents, such as product brochures, etc. Further, different types of interactions may be available depending on the participant's access level. For example, participants with higher access levels may be able to directly interact with participants within the expo booth or booth space and with booth personnel, while participants with lower access levels may only be able to interact with booth personnel, but not with other participants.

While in the expo booth 550, the participants A-D may exchange audio and video streams with the booth sponsor and/or the booth speaker, as well as with the other participants. For example, the audio and video streams from the expo participant client devices 540*a-d* may be received by the video conference provider 510 and transmitted to the booth sponsor client devices 552 and the booth speaker client device 554, and vice versa. In embodiments where the booth 550 includes a booth space, the participants A-D's ability to exchange audio and video streams with the speaker in the booth space may be limited. For example, the video conference provider 510 may receive audio and video streams from the booth speaker client device 554, and those audio and video streams are transmitted to the expo participant client devices 540*a-d*, the audio and video streams from the expo participant client devices 540*a-d* may not be transmitted by the video conference provider 550 to the booth speaker client device 554, unless permission is granted to do so. In this manner, a booth space may provide for a one-way communication meeting, allowing for presentations to an audience within the booth.

However, while participants are on the expo floor 565, their interactions may be limited to other participants that are also on the expo floor 565. Thus, in some examples, participants E-M on the expo floor may be able to interact with each other, but not be able to interact with participants A-D who are in an expo booth. For example, as will be discussed in more detail below, if a participant on the expo floor 565 desires to engage in a meeting with another participant, they may send a request for a meeting to the other participant, but not to participants that are located in an expo booth. Similarly, participants in an expo booth may only be able to request meetings with other participants in the expo booth. However, other examples may allow a participant to request a meeting with any other participant, regardless of their location within an expo.

As noted above, the virtual expo may include more than one booth 550, and the booth 550 in turn may include one or more booth spaces. Thus, during the virtual expo, a participant may navigate between different video conferences, beginning with the virtual expo floor before proceeding into an expo booth and potentially further into a booth space within an expo booth.

Figure 6:
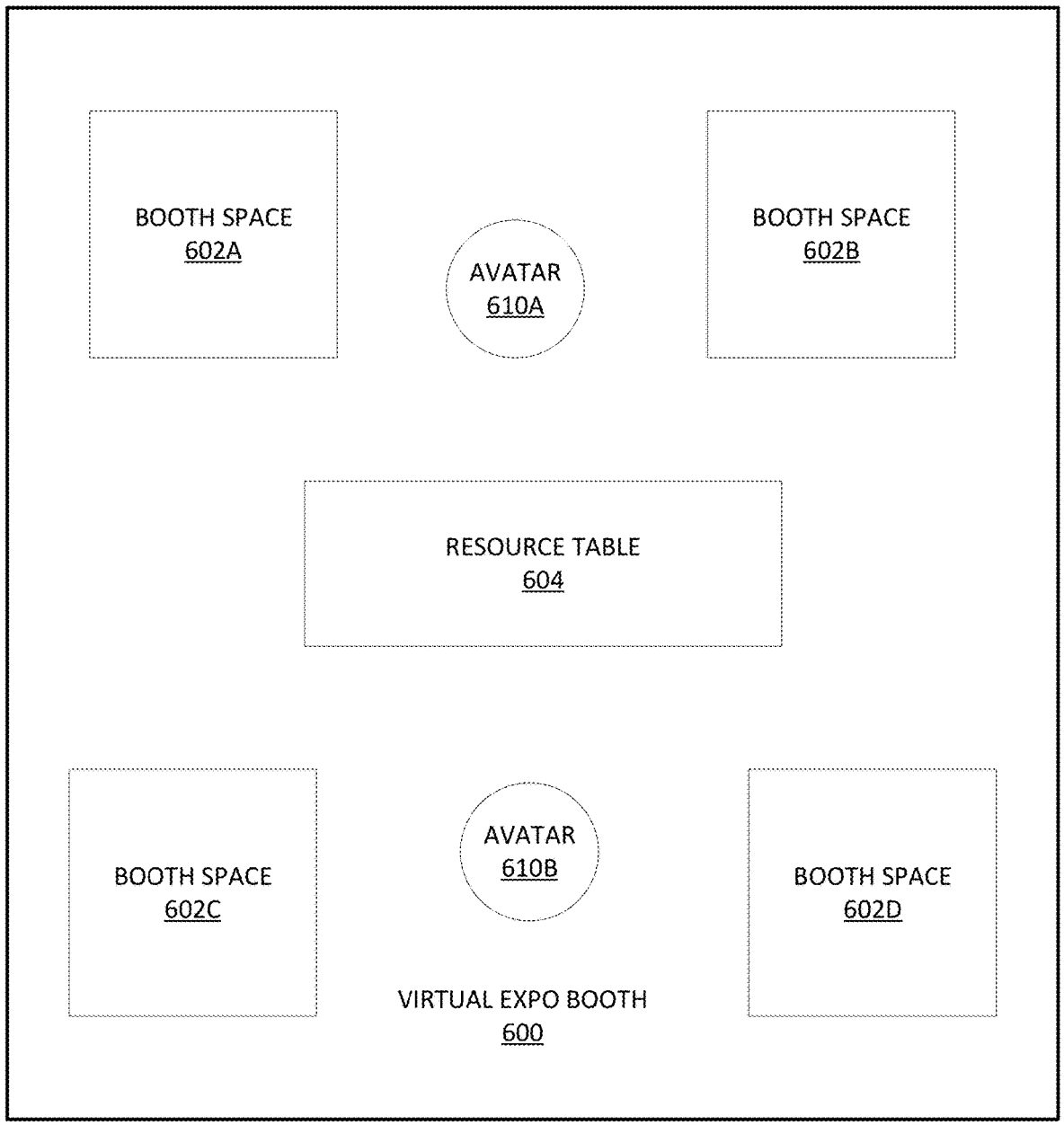
FIGS. 6 and 7A-7B show graphical representations of example virtual expos.

Referring now to FIG. 6, FIG. 6 is an illustration of a graphical representation of an example virtual expo booth. The booth 600 may be similar to any of the booths shown in FIG. 5, and therefore be a graphical representation of a video conference within a virtual expo. For example, the booth 600 may be the tier 1 booth 402*a*, and have an associated permission level that permits the booth 600 to include one or more booth spaces 602*a-d* and a resource table 604. During the virtual expo, the booth 600 may host one or more participants that have elected to join the booth 600, who are represented by the avatars 610*a-b*. The avatars 610*a-b* may represent the same participants as the avatars 510*a-b*, where the participants have joined the booth 402*a*.

The booth spaces 602*a-d* may be graphical representations of video conferences within the booth 600. In other words, the booth spaces 602*a-d* may be yet another nested video conference within a virtual expo. The booth spaces 602*a-d* may be graphically represented by an image file in a format such as a JPEG, PNG, TIFF, or other image file. The booth spaces 602*a-d* may be represented by video files in a format such as a GIF, a MPEG, or other video file. The graphical representation may include sound files. The graphical representation of each booth space 602a-d may be determined by the sponsor of the booth.

As participants attempt to join expo booths or booth spaces, the video conference provider 310 accesses the participants' profiles and access levels to determine their respective permissions with the video conferences corresponding to the expo booths or booth spaces. Depending on their access levels, the video conference provider 310 may enable or disable the participants' abilities to provide audio or video streams, engage in text chat discussions, or otherwise interact with the video conference. For example, the lowest level of access may allow a participant to join an expo booth or booth space, but only allow them to receive audio and video streams from the booth sponsor or booth personnel, but not other participants. Higher levels of access may allow the participants to engage with the other participants via audio, video, text chat, or other means. These levels of access are configured by the expo host, the expo booth's sponsor, or based on sponsorship levels or tiers as discussed above during configuration of the virtual expo.

Figure 7A:
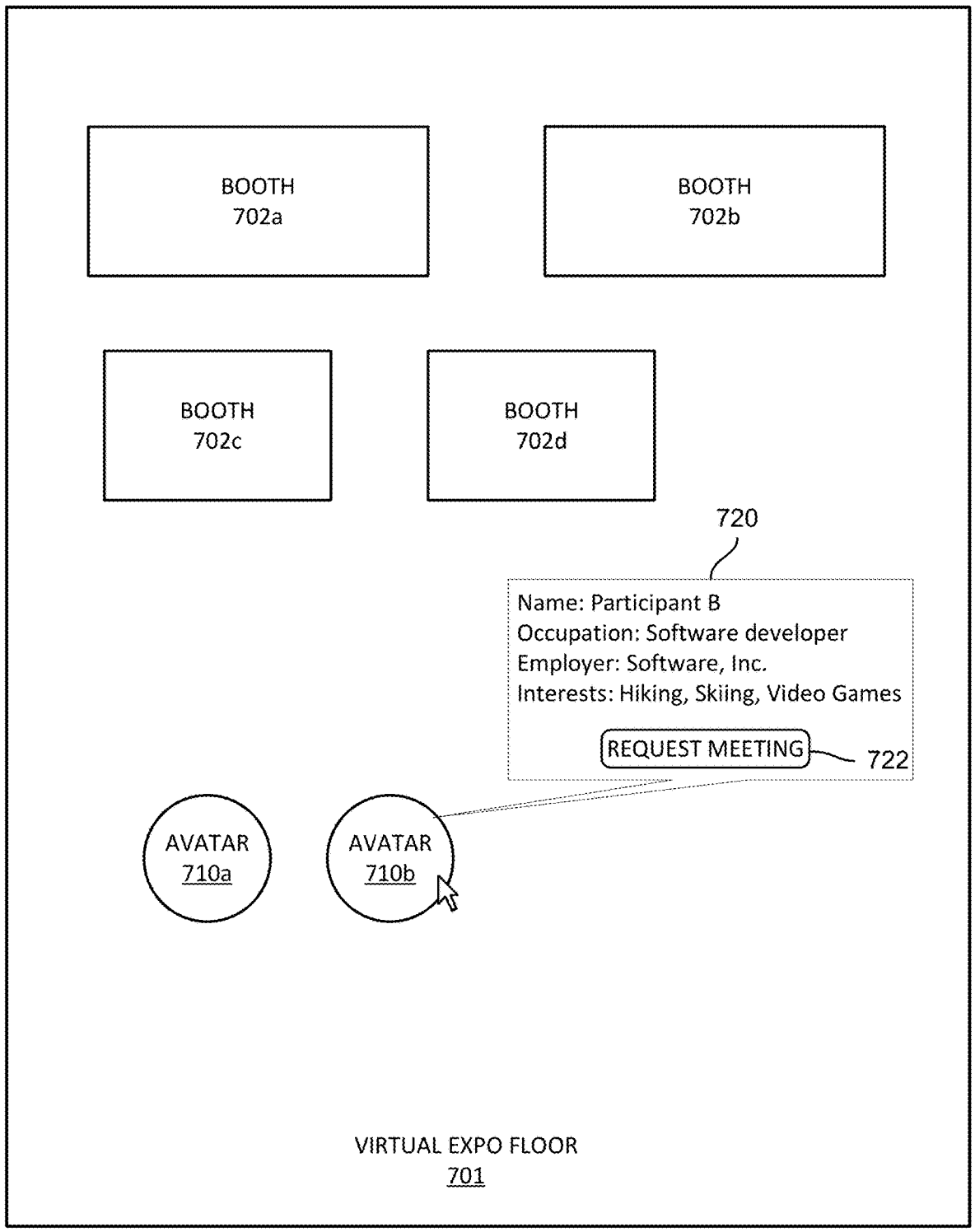

Referring now to FIGS. 7A, FIG. 7A shows an example graphical representation of a virtual expo floor 701 (or "expo floor 701") that may be displayed by a participant's client device, similar to the example shown in FIG. 4. The expo floor 701 includes several expo booths 702a-d as well as two avatars 710a-b corresponding to participants in the virtual expo. One avatar 710a represents participant A, while the second avatar 710b represents another participant, participant B. Participant A moves their avatar 710a into proximity of the second avatar 710b and moves their mouse cursor over the second avatar 710b to obtain some information about the corresponding participant.

In response to participant A moving their mouse cursor over the second avatar 710b, a pop-up window 720 is displayed, which includes some information from the other participant's profile. In this example, the pop-up window 720 provides the other participant's name, occupation, employer, and several interests. In addition, the pop-up window 720 provides an option 722 to request a meeting with the other participant, such as a video conference. In this example, the other participant has elected to allow other participants to join meetings with them, such as by selecting an option specifying that they are interested in networking. In this example, the video conference provider 310 allows participant-to-participant meetings to occur via video and audio, by text chat, or a combination of the two; however, some examples may only allow one or the other.

While in this example participant A used their mouse to interact obtain additional information about the other participant, in some examples, a pop-up window 720 may be displayed based on moving into proximity with another participant or on top of the avatar for another participant. In some examples, a participant may select an option to automatically show information for other participants, irrespective of their distance from the participant's avatar.

Figure 7B:
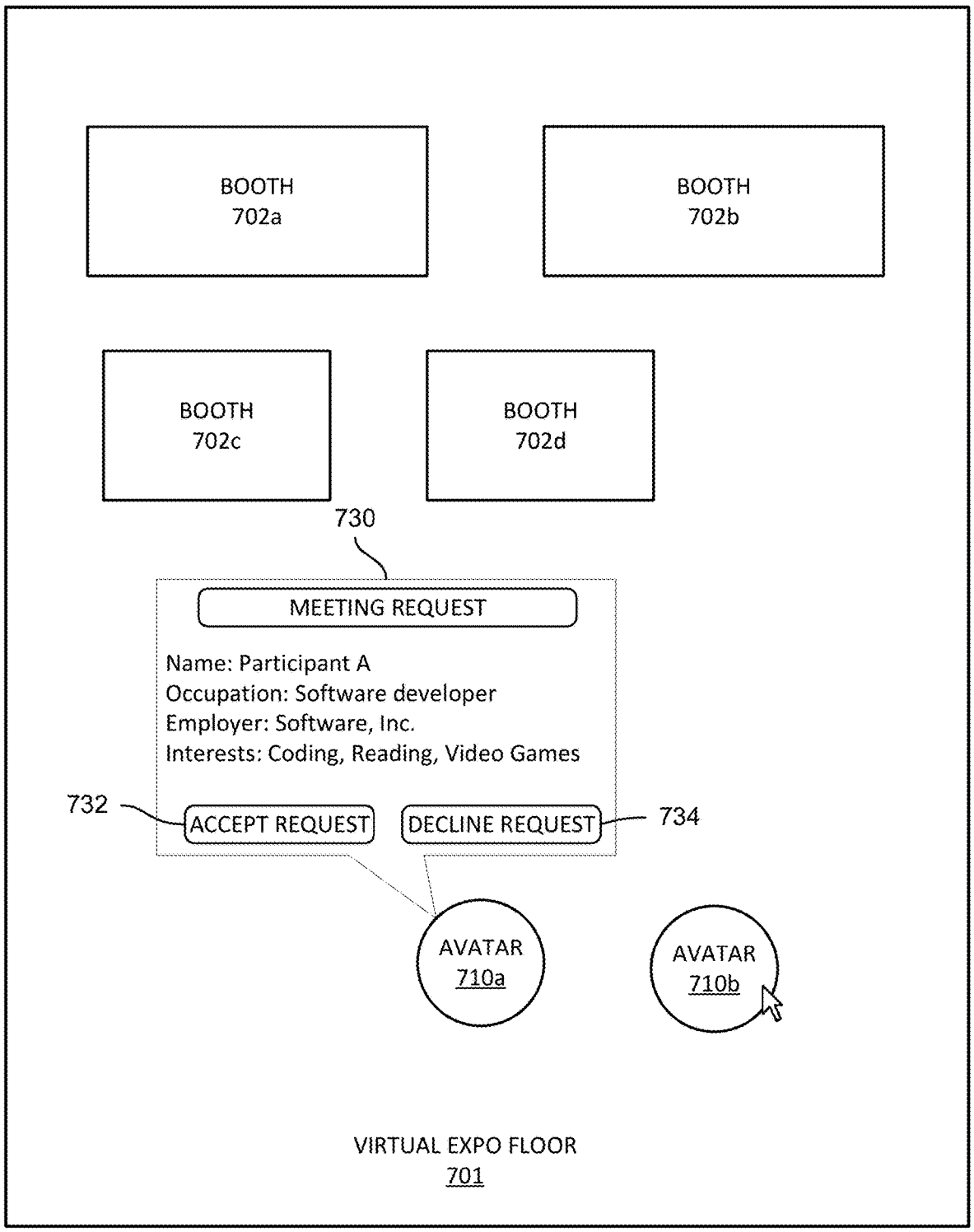

FIG. 7B shows the example graphical representation of a virtual expo floor 701 (or "expo floor 701") from the perspective of the participant controlling avatar 710b. In this case, the participant is notified of the request from the participant controlling avatar 710a. A pop-up window 730 for the request is presented that includes information about the participant as well as options to accept the request 732 or decline the request 734. Thus, the participant may obtain information about the requesting participant and determine whether or not to accept the request.

Figure 8:
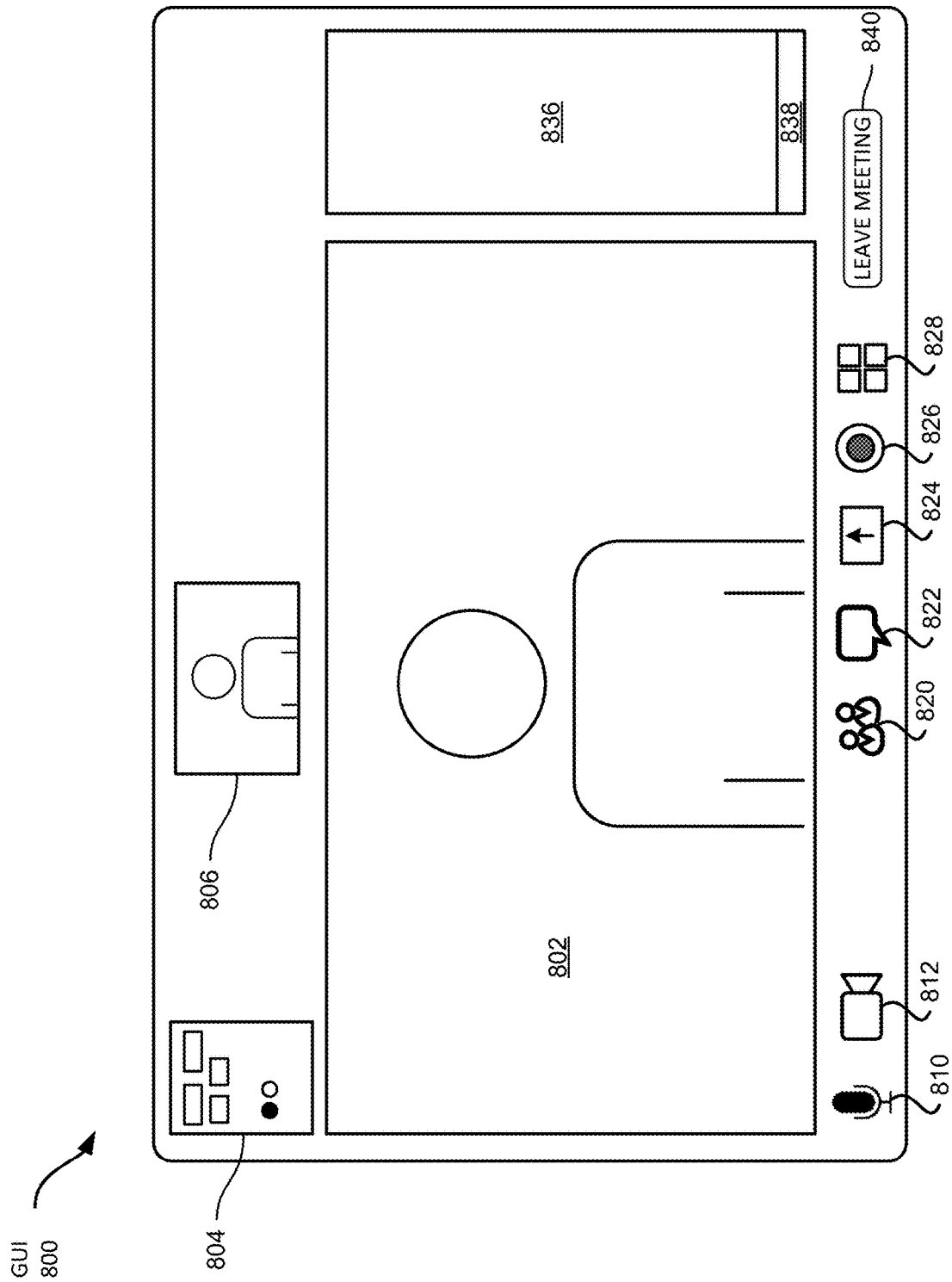
FIG. 8 shows an example graphical user interface ("GUI") for participant interactions during a virtual expo.

Referring now to FIG. 8, FIG. 8 shows an example GUI 800 that a participant's client device may display while interacting with another participant during a virtual expo in a conversation. A client device, e.g., client device 330 or client devices 340a-n, executes video conferencing software, which in turn displays the GUI 800 on the client device's display. In this example, the GUI 800 includes a speaker view window 802 that presents the video stream from the other participant's client device—the participant corresponding to avatar 710b in this example—while a smaller participant window 804 shows the video stream from the participant's own client device.

Beneath the speaker view window 802 are a number of interactive elements 810-828 to allow the participant to interact with the video conference software. Controls 810-812 may allow the participant to toggle on or off audio or video streams captured by a microphone or camera connected to the client device. Control 820 allows the participant to view any other participants in the video conference with the participant, while control 822 allows the participant to send text messages to the other participants. Control 824 allows the participant to share content from their client device. Control 826 allows the participant to toggle recording of the meeting, and control 828 allows the user to select an option to join a breakout room, though in this example, with only two participants, breakout room functionality may be disabled. The GUI also includes a chat window 836 and chat text entry area 838, which may be toggled by control 822, to allow the participants to exchange text messages. Control 840 allows the participant to leave the meeting when they are ready to do so.

In addition to the video conferencing features of the GUI, the GUI 800 also displays a view of the virtual expo 804 that the participants are attending. The participant's own avatar 710a is shaded to differentiate it from other participants that may also be visible. Thus, the participant can continue to navigate the virtual expo, if they desire. For example, if one participant suggests going to a particular expo booth, the participants may navigate their avatars to the expo booth without leaving the conversation. Thus, while the participants engage in their interaction, they remain within the virtual expo. It should be appreciated that the view 804 of the virtual expo may not be shown in some examples.

Figure 9:
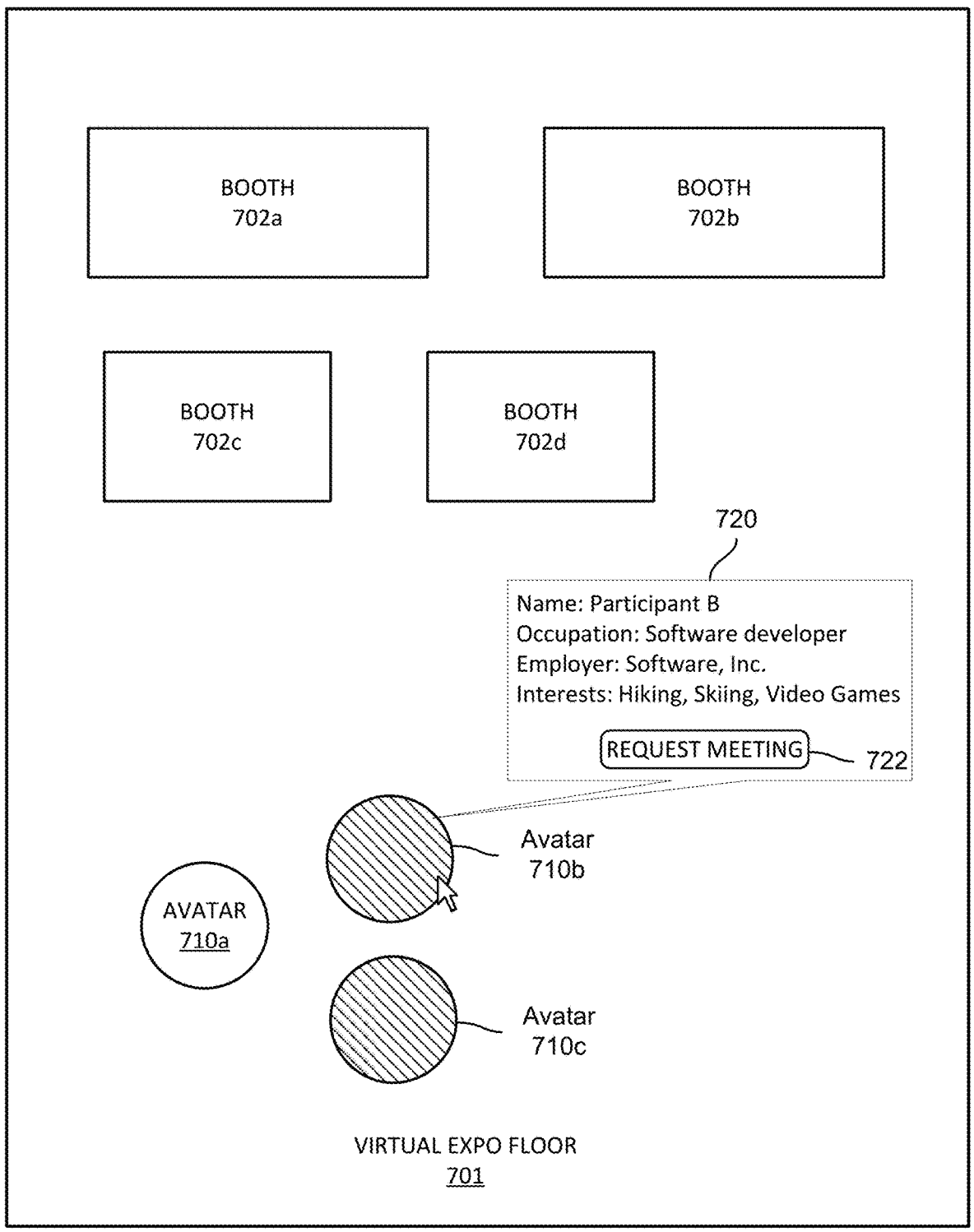
FIG. 9 shows a graphical representation of an example virtual expo

Referring now to FIG. 9, FIG. 9 shows another graphical representation of the expo floor 701 from FIG. 7 that may be displayed by a participant's client device. In this example, a third avatar 710c is displayed. In addition, avatars 710b-c have been shaded to indicate that the two participants are in a conversation. However, the participant controlling avatar 710a, participant A, may still attempt to interact with the other participants, such as depicted in FIG. 9. The participant has accessed the pop-up window 720 as discussed above with respect to FIG. 7 and may see information about the participant and request a meeting 722.

If participant A sends a request to meeting to the participant controlling avatar 710b, i.e., participant B, participant B will be able to allow participant A to join their conversation with participant C controlling, or they may leave their then-current meeting to join a meeting with participant A.

Figure 10:
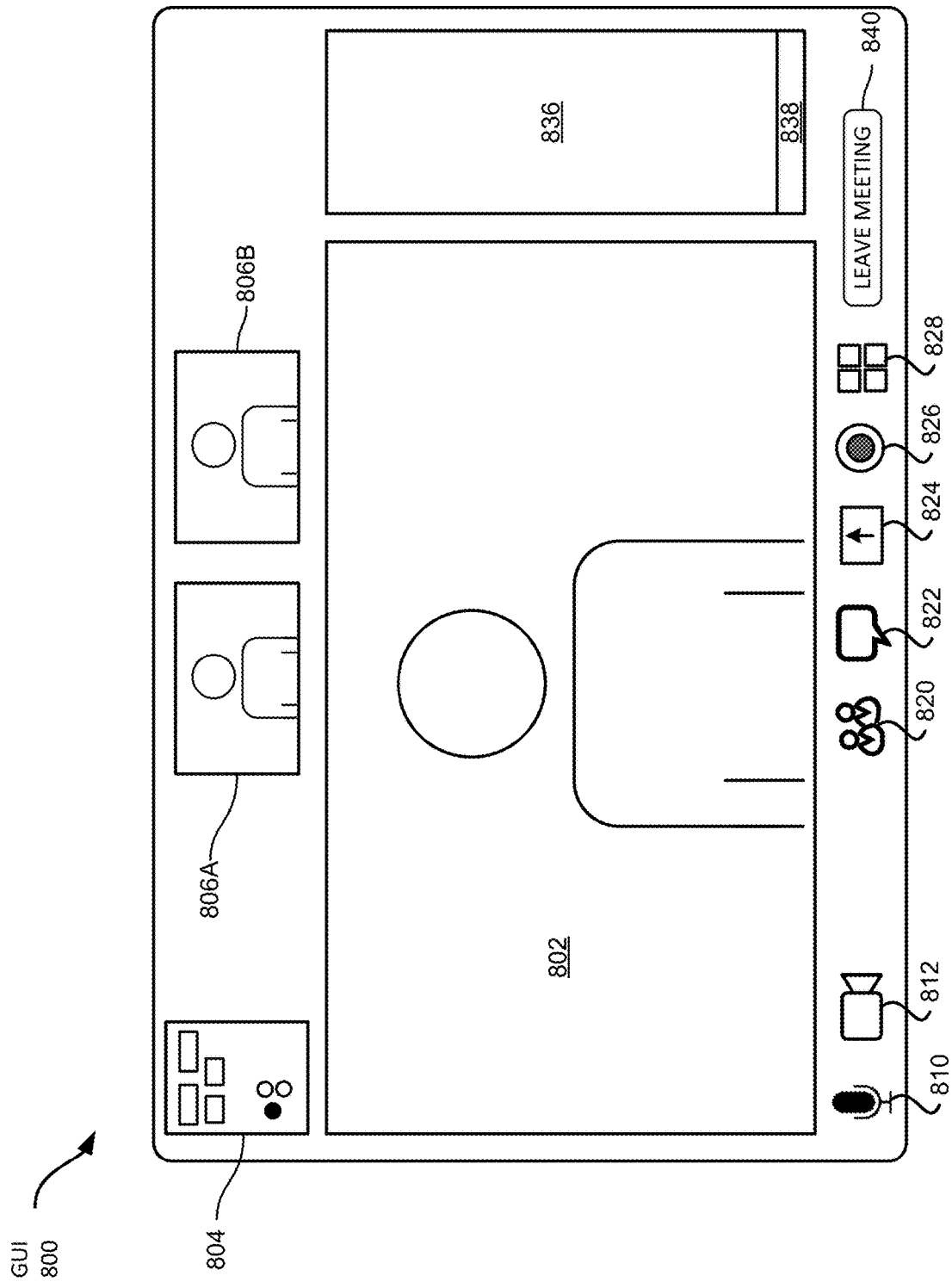
FIG. 10 shows an example GUI for participant interactions during a virtual expo.

Referring to FIG. 10, FIG. 10 shows the GUI of FIG. 8; however, in this example, the participant has joined the conversation between the participants controlling avatars 710b-c. Thus, the GUI includes two participant windows 806a-b positioned above the speaker view 802. In this example, the participant who is speaking will be shown in the speaker view window 802, while the other two participants will be shown in the other windows 806a-b. And while this example includes three participants, additional participants may join the meeting, with additional participant windows 806a-b being added for the additional participants. If more participants join than can be displayed within the GUI 800 at a single time, a subset of the participants may be shown and the GUI may add the option to scroll through all of the participant windows 806a-b, such as by presenting left or right arrows near the participant windows 806a-b.

Figure 11:
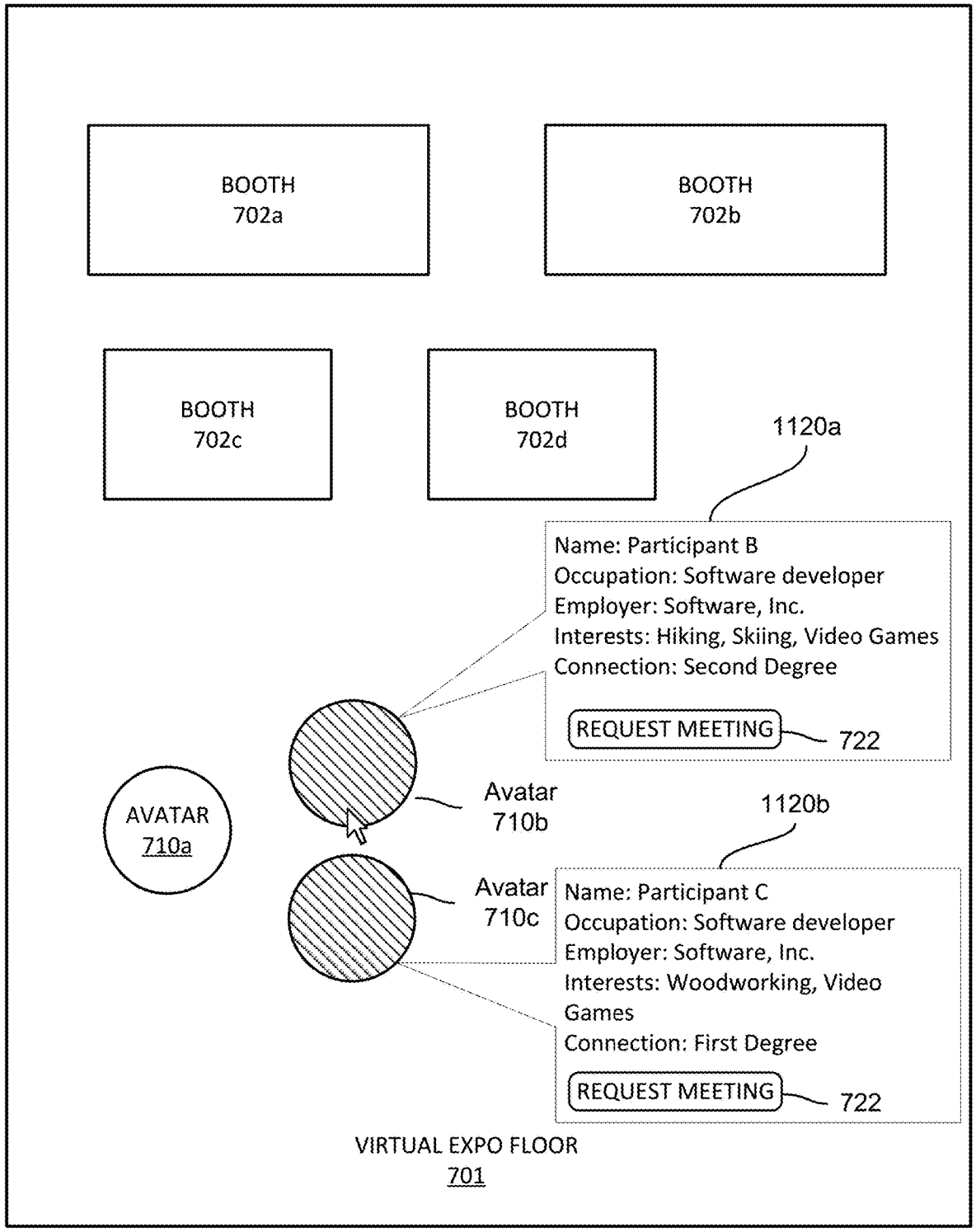
FIGS. 11-13 show graphical representations of example virtual expos.

Referring now to FIG. 11, FIG. 11 shows another graphical representation of the expo floor 701 from FIG. 7 that may be displayed by a participant's client device. In this example, a third avatar 710c is displayed. In addition, avatars 710b-c have been shaded to indicate that the two participants are in a conversation. In addition, when the participant A (controlling avatar 710a) attempts to interact with the avatar 710b, a pop-up window 1120a is displayed that includes the information discussed above with respect to FIG. 7. In this case, participant B (controlling avatar 710b) is a second-degree connection to participant A via participant C (controlling avatar 710c). Similarly, if participant A attempts to interact with participant C's avatar 710c, a corresponding pop-up window 1120b may be displayed.

As a part of registering for the virtual expo, participants may be provided with the option to include links to one or more of their social media profiles. The video conference provider 310 may analyze the participants' social media profiles to identify relative connections between the various participants and, if a participant has agreed to allow the video conference provider 310 to make such information publicly available, provide that information to other participants during the virtual expo. In this example, the participant A is directly connected to participant C, but not to participant B. However, because two participants are directly connected, the video conference provider 310 can provide indirect connection information in the pop-up window. In this case, participant C is directly connected to the other two participants. Thus, participant A can see the second-degree connection to participant B. If participant A would like an introduction to participant B, this may be an opportune moment and participant A may send a request to participant C to join the meeting. Thus, participant C can join participant A to the meeting and introduce them to participant B.

While in this example, video conference provider 310 has provided the direct and indirect connection information based on the conversation between participants B and C, such limitations are not needed. For example, the video conference provider 310 may provide direct or indirect connection information about other participants independently of any interactions between those participants. For example, a participant may select any avatar in the virtual expo and view a pop-up window, which may include connection information, such as direct or indirect connection information.

Figure 12:
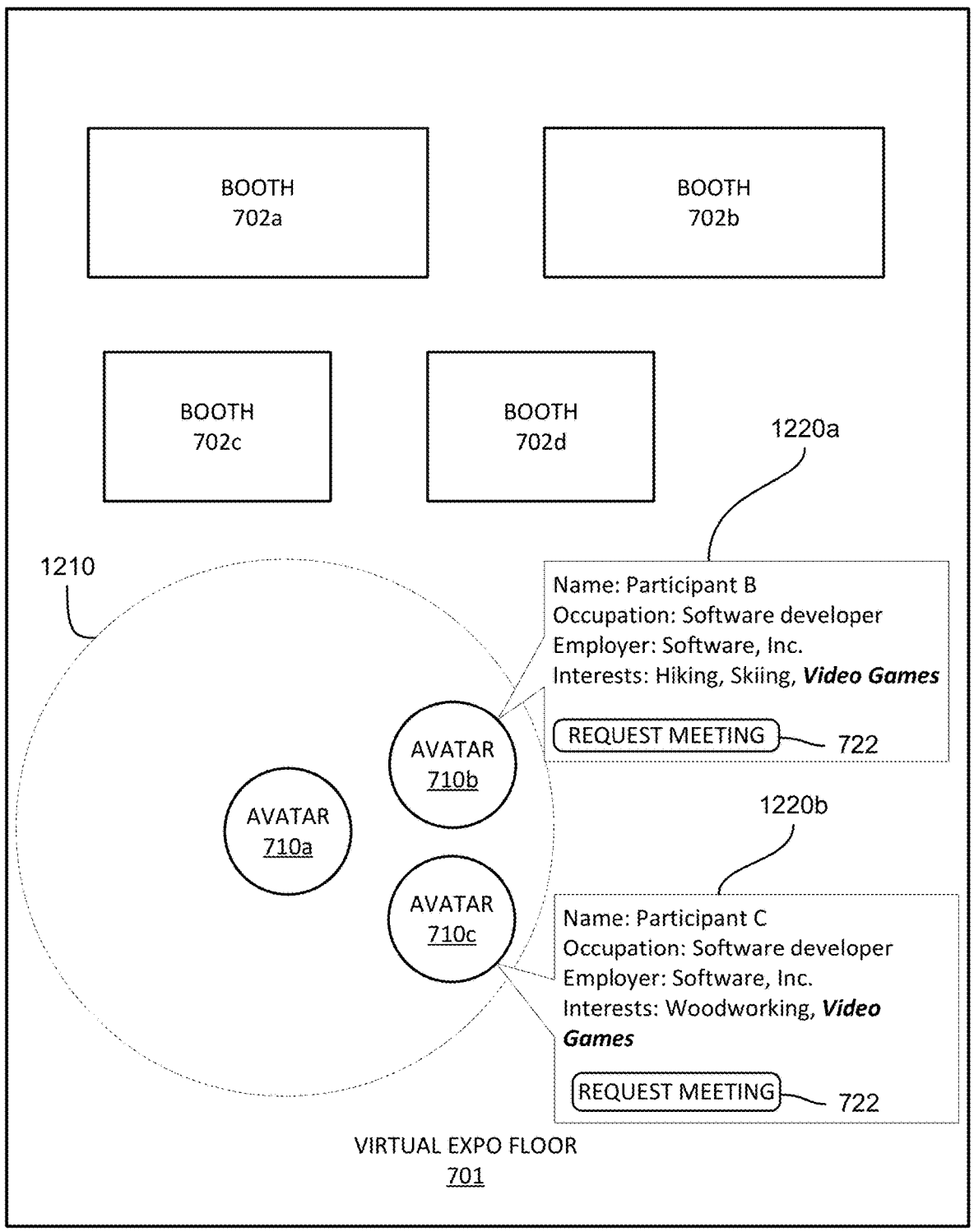

Referring now to FIG. 12, FIG. 12 shows another graphical representation of the expo floor 701 from FIG. 7 that may be displayed by a participant's client device. In this example, the video conference provider 310 tracks participants' avatars as they navigate the expo floor 701 and determines when two (or more) avatars are in proximity to each other and have one or more shared interests.

As can be seen in FIG. 12, the video conference provider 310 has established a proximity threshold 1210 around avatar 710a and has determined that avatars 710b-c are within the proximity threshold 1210. The video conference provider 310 then determines that the participants associated with the avatars 710b-c have a common interest in video games with participant A. In response, the video conference provider 310 has presented pop-up windows 1220a-b, similar to pop-up window 720, but in this example, interests for the respective participants that are common to participant A's interests are emphasized. Thus, participant A can decide whether to join a meeting with either or both of the corresponding participants. Similarly, participants B and C may be similarly notified by the video conference provider 310 of the other avatars in their respective proximity thresholds.

Further, while in this example, none of the participants are engaged in a meeting with each other, the functionality may be employed even if some (or all) of the participants are already engaged in a meeting. For example, if participants B and C are in a meeting and participant A is notified of their common interests, participant A may request a meeting with either (or both) of participants B and C, such as described above with respect to FIG. 9. Further, in some examples, if the participants B and C are engaged in a meeting and have authorized the video conference provider 310 to analyze their conversation, the video conference provider 310 may perform speech recognition and employ natural language processing or keyword searching to identify the subject matter of the conversation and provide a notification to participants corresponding to other nearby avatars, if the subject matter of the conversation aligns with one or more of those participants' interests. For example, a pop-up window may be displayed, similar to the pop-up windows 1220a-b.

It should be appreciated that while in this example, the video conference provider 310 provides a proximity threshold 1210, in some examples, the participant's client device may establish the proximity threshold 1210. In one such example, the client device may determine whether any other avatar(s) is within the proximity threshold 1210 and, if so, request participant information corresponding to the identified avatar(s). The client device may then provide one or more pop-up windows corresponding to the identified avatars, similar to the examples shown in FIG. 12.

Figure 13:
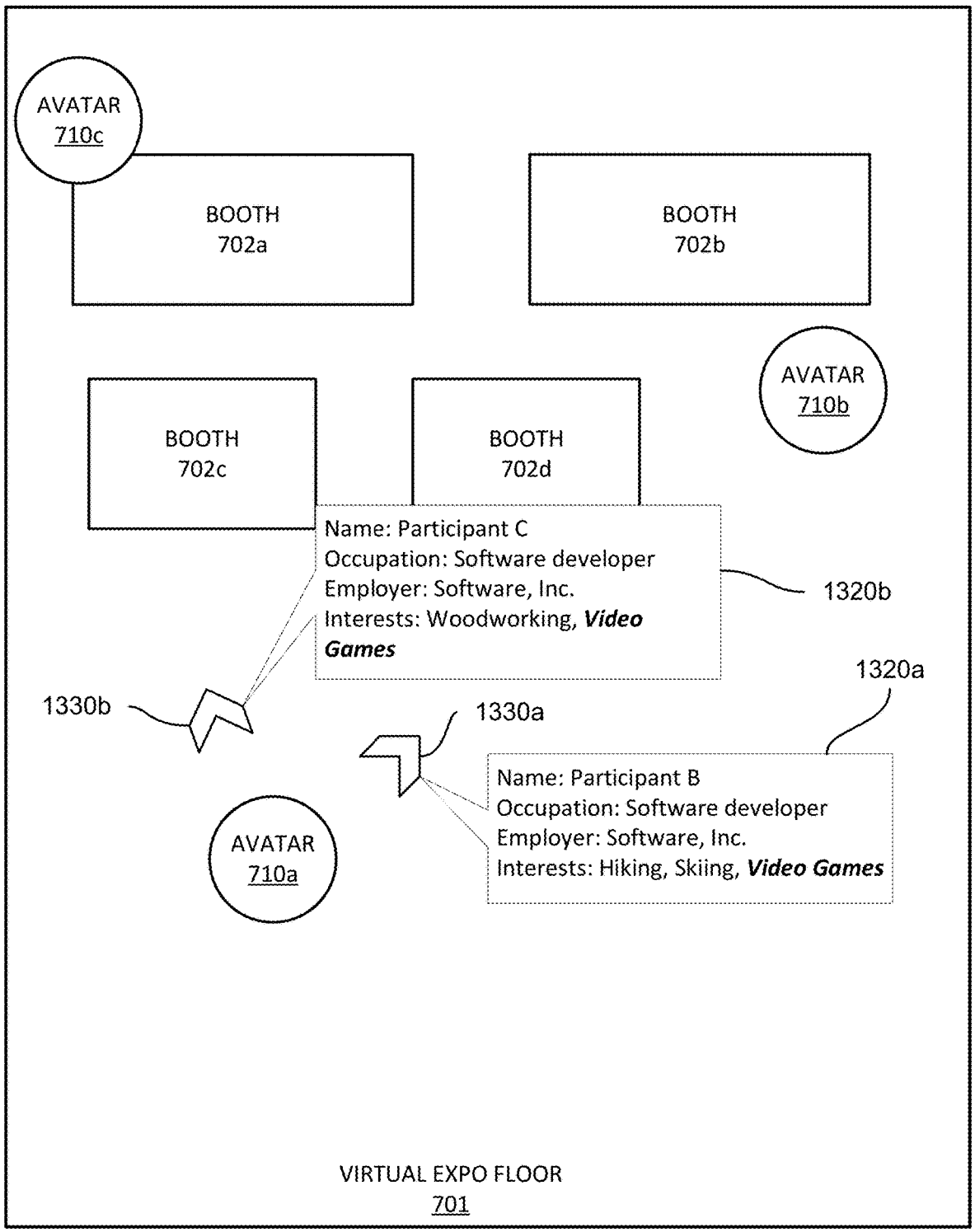

Referring now to FIG. 13, FIG. 13 shows another graphical representation of the expo floor 701 from FIG. 7A that may be displayed by a participant's client device. In this example, participant A (controlling avatar 710a) has selected an option to find other participants with similar interests. However, none are in proximity to the avatar 710a, as was the case in FIG. 12. Instead, the video conference provider 310 analyzes other participants attending the virtual expo to identify participants with at least one interest in common with participant A. The video conference provider 310 identifies multiple participants with interests common to participant A, but identifies participants B and C who are closest to participant A's avatar 710a and who both share participant A's interest in video games.

After identifying participants B and C, the video conference provider 310 provides indications corresponding to participants B and C to identify a direction on the virtual expo floor 710 to each. After receiving the indications, participant A's client device displays graphical indicators 1330a-b to identify the directions to the two identified participants. In addition, if participant A interacts with an indicator 1330a-b, information about the corresponding participant may be displayed in a pop-up window 1320a-b. If participant A elects to move towards one of the identified participants, they may move close enough to request a meeting interaction, such as discussed above with respect to FIG. 7A. Such functionality can help guide a participant to other participants that may be of interest. Further, while this example identifies common interests, other options may be used, such as connections identified from social media platforms, common employers, and common job titles.

Figure 14:
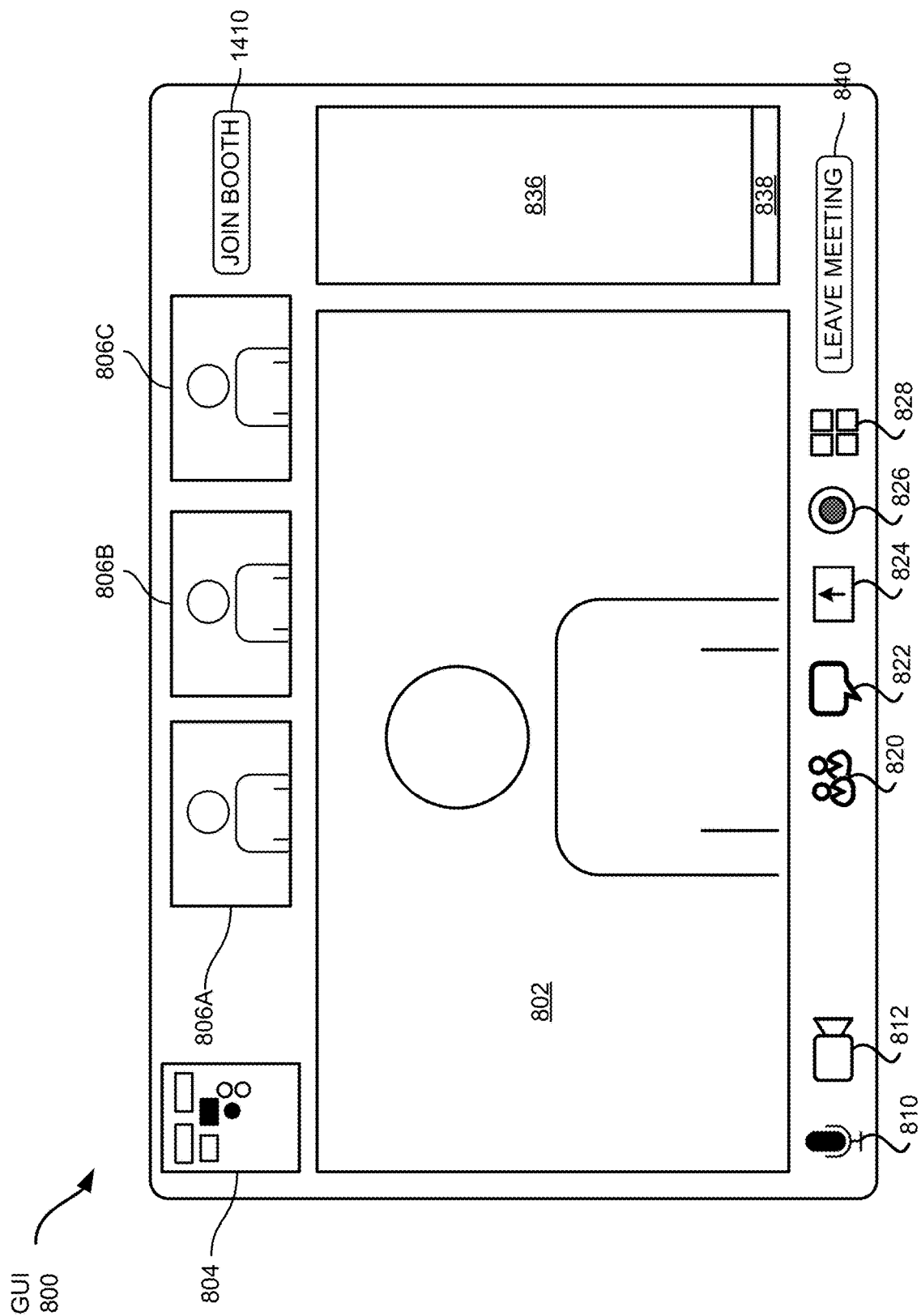
FIG. 14 shows an example GUI for participant interactions during a virtual expo.

Referring now to FIG. 14, FIG. 14 shows an example GUI 800 for participant interactions during a virtual expo. In this example, the three participants in FIG. 14 have joined a virtual meeting with each other and have collectively navigated to a virtual expo booth 702d of interest to each of them. One of the participants has then selected an option 1410 to join the virtual expo booth 702d together from within their virtual meeting as a watch party. The watch party functionality allows the participants to access another virtual meeting from within an existing virtual meeting and obtain the audio and video feeds from that virtual meeting as though they were each attending individually. Moreover, the other participants in the virtual expo booth may be aware that the participants have joined, but may not be notified that the participants have joined as a watch party.

The GUI 1400 provides video from the virtual expo booth in the speaker window 802 and all of the participants from the original virtual meeting are presented in participant windows 806a-c above the speaker window 802. In addition, the representation of the virtual expo 804 has been updated to highlight the participant's avatar as well as the virtual expo booth that the watch party has joined. And while audio and video streams from the virtual expo booth are provided in the speaker window, the audio and video streams from the participants in the watch party are only shared among the watch party participants. Similarly, text chat from the chat window 836 is private to the watch party. Some examples may provide a second chat window corresponding to the virtual expo booth 702d to allow the participants to separately engage in text chats within the virtual expo booth. However, content from the watch party is not shared with the virtual expo booth. Such functionality may allow participants who have met each other, or a group of friends, to experience the virtual expo together as a group.

Figure 15:
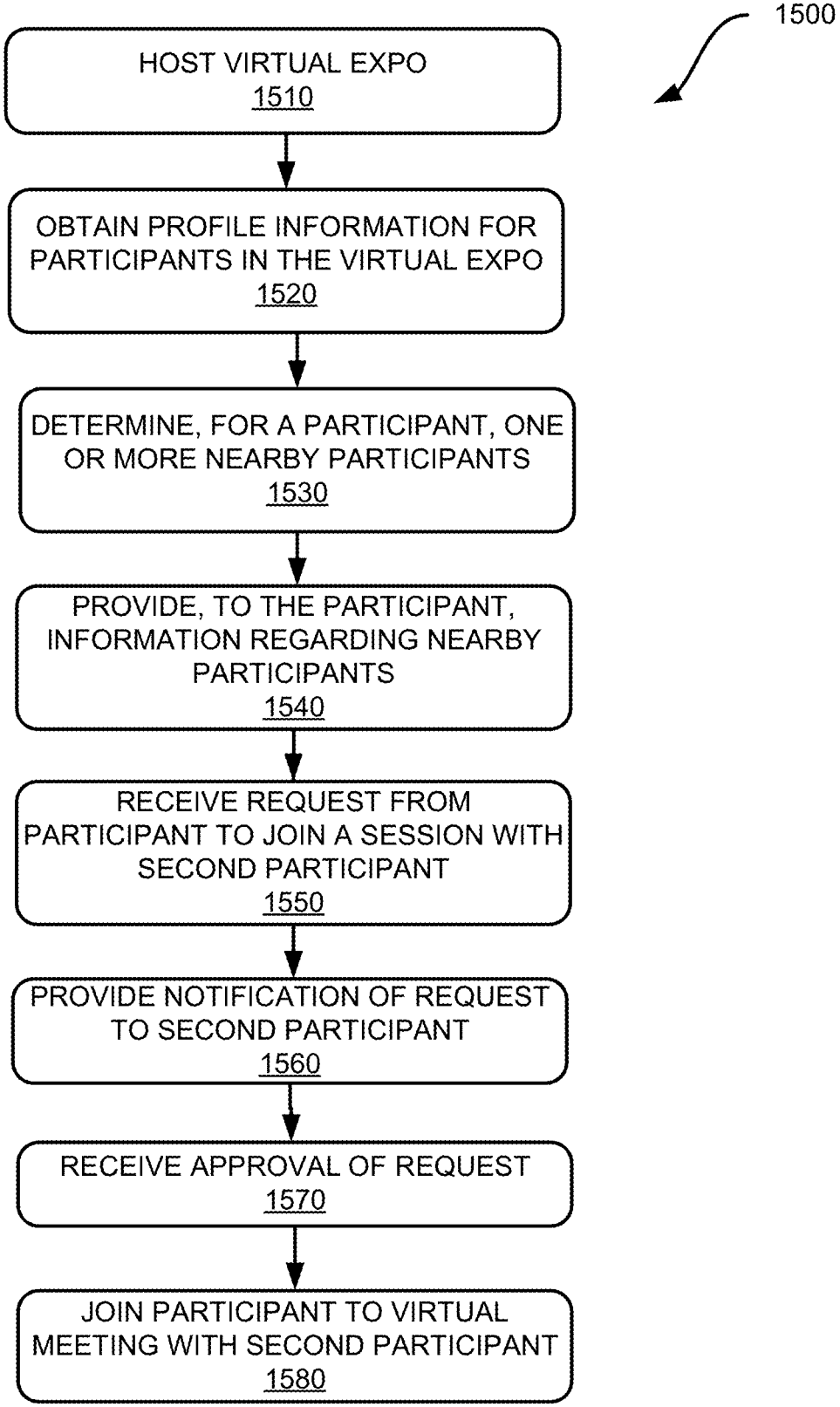
FIGS. 15-16 show example methods for participant interactions during a virtual expo.

Referring now to FIG. 15, FIG. 15 shows an example method 1500 for participant interactions during a virtual expo. The method 1500 of FIG. 15 will be described with respect to the system 300 shown in FIG. 3; however, any suitable system according to this disclosure may be employed.

At block 1510, a video conference provider 310 creates and hosts a virtual expo, generally as described above with respect to FIGS. 3-6.

At block 1520, the video conference provider 310 obtains profile information for participants in the virtual expo. For example, as described above, participants may provide profile information when they register for the virtual expo. In addition, if a participant provides permission, the video conference provider 310 may access one or more social media platforms and obtain information about the participant, such as contact information for other individuals or organizations.

At block 1530, the video conference provider 310 determines, for a participant, one or more nearby participants. As discussed above, the virtual expo floor 701 provides a space where participants can move avatars freely to find virtual expo booths to join or other participants to meet. Thus, as participants move around within the virtual expo floor, their avatars will be at varying virtual distances from each other. Thus, the video conference provider 310 can establish one or more proximity thresholds to use to determine when two participants are near to each other, which may cause other functionality to be performed or may allow certain interactions to occur. However, determining participants' relative distance to each other may not be used in some examples.

At block 1540, the video conference provider 310 provides, to the participant, information about nearby participants. As discussed above, such as with respect to FIGS. 7A-B, 9, 11, and 12, the video conference provider 310 may provide participant profile information to other participants, such as in response to a request sent from a participant's client device or in response to determining two participants are in proximity of each other. Such information may include names, employers, job titles, and interests. After receiving the information, the participant's client device may display the information, such as in a pop-up window 720.

At block 1550, the video conference provider 310 receives a request from a participant to join a meeting with a second participant. For example, a participant may interact with a graphical representation of a virtual expo to select an option 722 to request a meeting with another participant. When the participant selects the option, the participant's client device may transmit a request to the video conference provider 310, which may provide information identifying the second participant, such as an identifier associated with the second participant's avatar.

At block 1560, the video conference provider 310 provides a notification of the request to the second participant. For example, the video conference provider may send an indication to the second participant's client device as discussed above with respect to FIG. 7B.

At block 1570, the video conference provider 310 receives an approval of the request for the meeting. For example, the second participant may select the option to accept the request 732.

At block 1580, the video conference provider 310 joins the participant to a virtual meeting with the second participant. In this example, the video conference provider 310 creates a new video conference meeting, as described with respect to FIGS. 1 and 2, and joins the two participants to the new virtual meeting. However, if the second participant is already participating in a meeting with another participant, the requesting participant may be joined to the virtual meeting for that meeting.

While the method 1500 in FIG. 15 has been described as including certain blocks, it should be appreciated that not all blocks may be required. For example, blocks 1530 and 1540 may be omitted in some examples. Further, in some examples, block 1570 may be omitted. For example, if an expo host desires to have a meeting with a participant, the participant may not be given the option to decline the meeting and may instead be automatically joined to the virtual meeting with the expo host.

Figure 16:
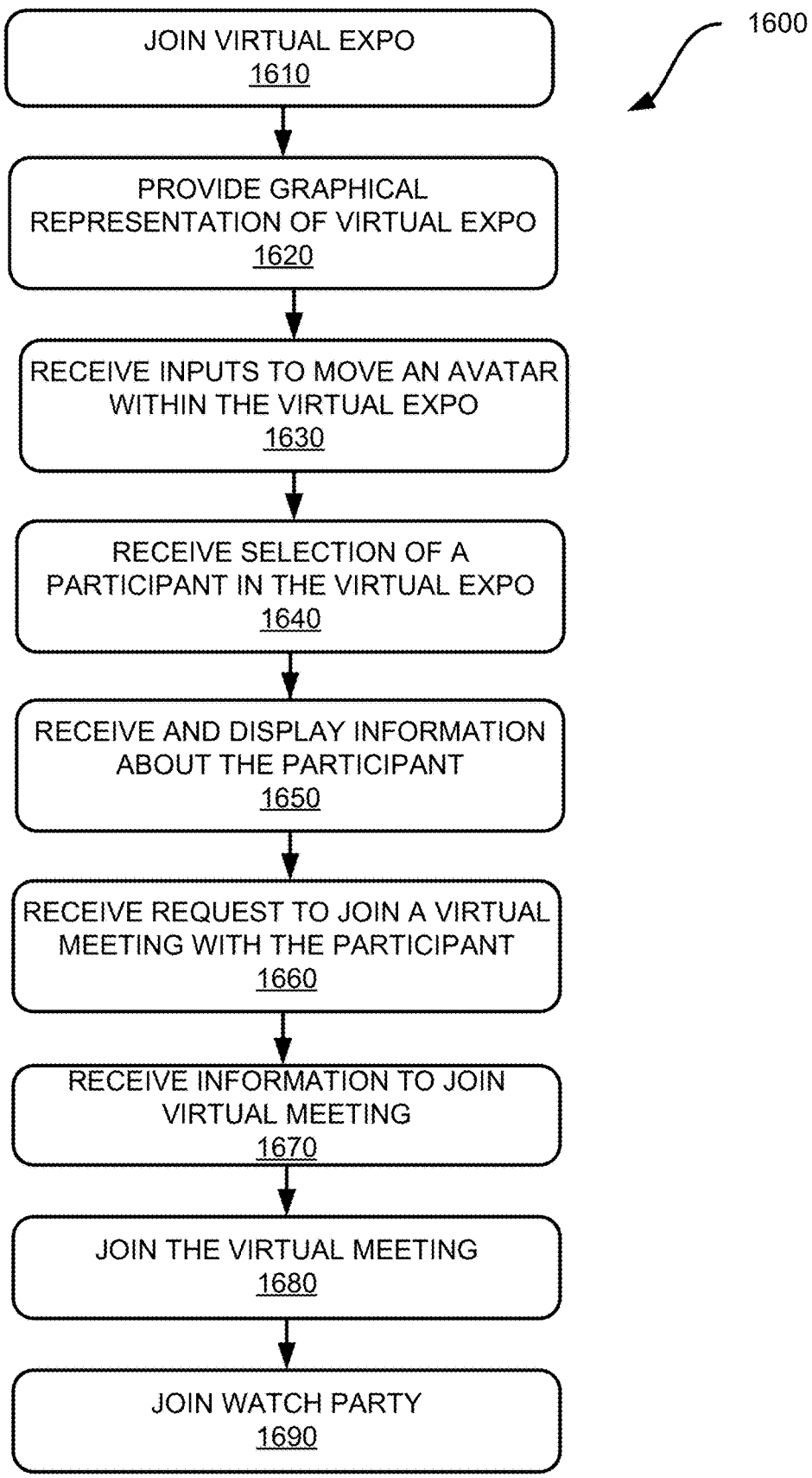

Referring now to FIG. 16, FIG. 16 shows another example method 1600 for participant interactions during a virtual expo. The method 1600 of FIG. 16 will be described with respect to the system 300 shown in FIG. 3; however, any suitable system according to this disclosure may be employed.

At block 1610, a participant uses their client device 340a to join a virtual meeting providing a virtual expo, generally as discussed above with respect to FIGS. 1-6.

At block 1620, the participant's client device 340a provides a graphical representation of the virtual expo, such as the example shown in FIGS. 7A-B. In this example, the graphical representation provides a two-dimensional representation of the virtual expo floor 701; however, in some examples the graphical representation may be a three-dimensional representation of the virtual expo floor 701 displayed on a display or a virtual reality ("VR") or augmented reality ("AR") representation of the virtual expo floor 701. As discussed above, the graphical representation may include virtual expo booths and avatars corresponding to participants in the virtual expo.

At block 1630, the participant's client device 340*a* receives inputs to navigate the participant's avatar 710*a* within the virtual expo floor 701. As the participant moves the avatar 710*a*, the graphical representation of the virtual expo floor 701 may be updated to show the new location of the avatar or other portions of virtual expo floor 701.

At block 1640, the participant's client device 340*a* receives a selection of a participant in the virtual expo. A participant may select another participant by using a mouse to move a cursor over an avatar corresponding to the other participant or by touching a location on a touchscreen corresponding to the other participant. In a VR or AR setting, a participant may select another participant by making a selection gesture, such as by pointing at an avatar.

At block 1650, after selecting the participant, the participant's client device 340*a* may receive information from the video conference provider 310 about the selected participant, such as from the participant's profile, including their name, job title, employer, and interests.

After receiving the information about the participant, the client device 340*a* may display a portion of the information in the graphical representation of the virtual expo, such as in a pop-up window 720.

At block 1660, the client device 340*a* generates a request to join a virtual meeting with the selected participant. For example, as discussed above with respect to FIG. 7, a participant may select a "request meeting" option 722 in the pop-up window 720. In response to receiving the participant's selection, the client device 340*a* generates and sends a request to the video conference provider 310 identifying the selected participant, such as a participant identifier, and the request for the virtual meeting.

At block 1670, the client device 340*a* receives information to join the virtual meeting. If the selected participant accepts the request, the video conference provider 310 may create a new virtual meeting or obtain information about an existing virtual meeting that includes the selected participant, as discussed above with respect to block 1580. Information to join the virtual meeting, such as a link, may then be provided to the client device 340*a*, which receives it from the video conference provider 310.

At block 1680, the client device 340*a* uses the received information to join the virtual meeting. After joining the virtual meeting, the client device 340*a* may display a GUI, such as GUI 800, to allow the participants to interact with each other.

At block 1690, the participants in the virtual meeting decide to join a virtual expo booth without leaving the virtual meeting. The video conference provider 310 receives the request to join the virtual expo booth and establishes the virtual meeting as a watch party corresponding to the virtual expo booth. Thus, the participants may receive one or more audio or video feeds from the virtual expo booth while remaining in their virtual meeting, where they can interact with each other.

Figure 17:
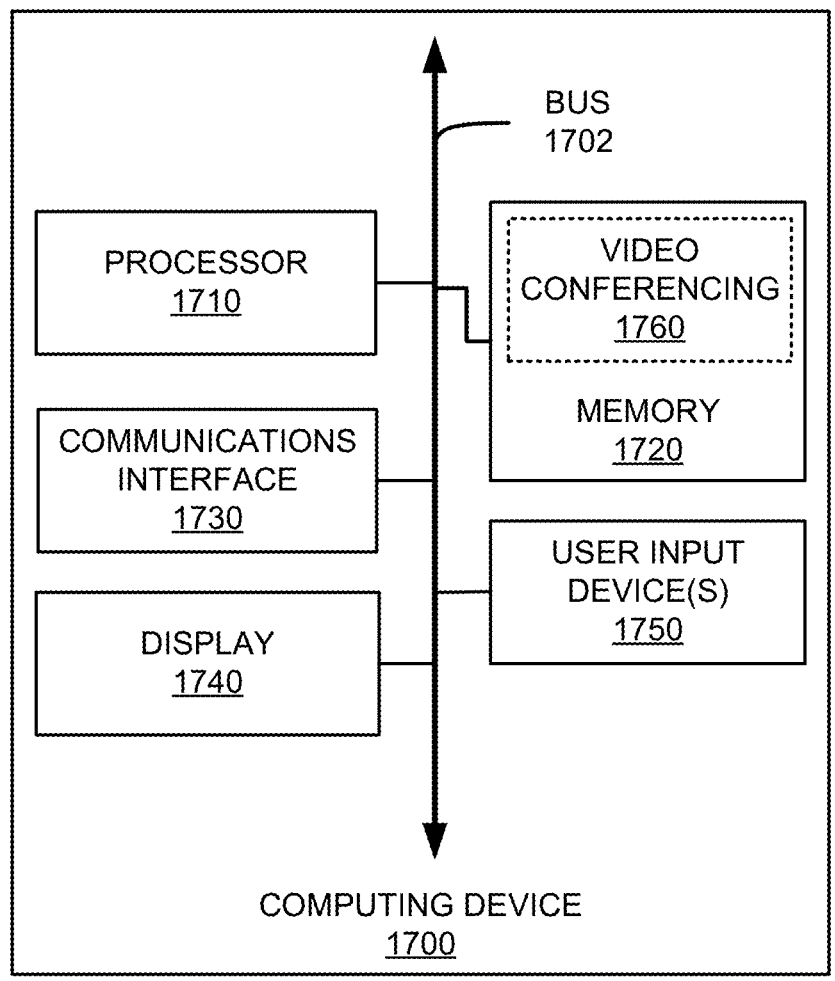
FIG. 17 shows an example computing device suitable for use with systems and methods for participant interactions during a virtual expo.

Referring now to FIG. 17, FIG. 17 shows an example computing device 1700 suitable for use in example systems or methods for participant interactions during a virtual expo according to this disclosure. The example computing device 1700 includes a processor 1710 which is in communication with the memory 1720 and other components of the computing device 1700 using one or more communications buses 1702. The processor 1710 is configured to execute processor-executable instructions stored in the memory 1720 to perform one or more methods for in-meeting follow-up schedulers for video conferences according to different examples, such as part or all of the example methods 1500, 1600 described above with respect to FIGS. 15 and 16. The computing device 1700, in this example, also includes one or more user input devices 1750, such as a keyboard, mouse, touchscreen, microphone, etc., to accept user input. The computing device 1700 also includes a display 1740 to provide visual output to a user.

In addition, the computing device 1700 includes a video conferencing application 1760 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual expo, etc. such as described throughout this disclosure, etc.

The computing device 1700 also includes a communications interface 1740. In some examples, the communications interface 1730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Multiple examples have been discussed; however, any number of examples may be employed according to this disclosure. For example, a first example includes a method that includes hosting, by a video conference provider, a virtual meeting comprising a virtual expo; receiving, from a first client device associated with a first participant in the virtual expo, a request to enter a meeting with a second participant in the virtual expo; providing, to a second client device associated with the second participant, a notification of the request; receiving, from the second client device, an approval of the request; and in response to receiving the approval, joining the first client device to a second virtual meeting.

A second example employs the method of the first example, further comprising creating the second virtual meeting; and joining the second client device to the second virtual meeting.

A third example employs the method of the first or second example, wherein the second client device and a third client device were previously joined with the second virtual meeting.

A fourth example employs the method of any of the first to third examples, further comprising determining one or more participants in proximity to the first participant in the virtual expo, the one or more participants including the second participant; determining a common interest associated with the first and second participants; and providing an indication to the first client device of the common interest and the second participant.

A fifth example employs the method of the fourth example, further comprising providing a second indication to the second client device of the common interest and the first participant.

A sixth example employs the method of any of the first to fifth examples, wherein the second client device and a third client device were previously joined to the second virtual meeting, a third participant associated with the third client device, and further comprising determining a proximity of the first participant to at least one of the second or third participants; determining a subject matter of a conversation between the second and third participants, the second virtual meeting configured as publicly accessible; determining a common interest between the first participant and the subject matter of the conversation; and providing an indication to the first client device of the common interest and the second virtual meeting.

A seventh example employs the method of any of the first to sixth examples, further comprising determining subject matter of conversations in a plurality of virtual meetings within the virtual expo, each virtual meeting of the plurality of virtual meetings configured as publicly accessible; identifying the second virtual meeting based on a respective subject matter of a conversation of the second virtual meeting and an interest of the first participant; providing an indication to the first client device of the common interest and the second virtual meeting; providing an indication of a location of at least one of the second or third participants.

An eighth example employs the method of any of the first to seventh examples, further comprising obtaining connection information between the first and second participants from a social media platform; and providing an indication to the first client device of the connection information.

A ninth example employs the method of any of the first to eighth examples, wherein the second client device and a third client device were previously joined to the second virtual meeting, a third participant associated with the third client device, and further comprising obtaining connection information between the first, second, and third participants from a social media platform; and providing one or more indications to the first client device of the connection information.

A tenth example employs the method of any of the first to ninth examples, wherein the second virtual meeting comprises a text chat.

An eleventh example is a system that includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to host a virtual meeting comprising a virtual expo; receive, from a first client device associated with a first participant in the virtual expo, a request to enter a meeting with a second participant in the virtual expo; provide, to a second client device associated with the second participant, a notification of the request; receive, from the second client device, an approval of the request; and in response to receipt of the approval, join the first client device to a second virtual meeting.

A twelfth example employs the system of the eleventh example, wherein the one or more processors are configured to execute further processor-executable instructions stored in the non-transitory computer-readable medium to create the second virtual meeting; and join the second client device to the second virtual meeting.

A thirteenth example employs the system of the eleventh or twelfth examples, wherein the second client device and a third client device were previously joined with the second virtual meeting.

A fourteenth example employs the system of any of the eleventh through thirteenth examples, wherein the one or more processors are configured to execute further processor-executable instructions stored in the non-transitory computer-readable medium to determine one or more participants in proximity to the first participant in the virtual expo, the one or more participants including the second participant; determine a common interest associated with the first and second participants; and provide an indication to the first client device of the common interest and the second participant.

A fifteenth example employs the system of any of the eleventh through fourteenth examples, wherein the one or more processors are configured to execute further processor-executable instructions stored in the non-transitory computer-readable medium to obtaining connection information between the first and second participants from a social media platform; and providing an indication to the first client device of the connection information.

A sixteenth example employs the system of the fifteenth example, wherein the one or more processors are configured to execute further processor-executable instructions stored in the non-transitory computer-readable medium to provide a second indication to the second client device of the common interest and the first participant.

A seventeenth example employs the system of any of the eleventh through sixteenth examples, wherein the second client device and a third client device were previously joined to the second virtual meeting, a third participant associated with the third client device, and wherein the one or more processors are configured to execute further processor-executable instructions stored in the non-transitory computer-readable medium to obtain connection information between the first, second, and third participants from a social media platform; and provide one or more indications to the first client device of the connection information.

An eighteenth example employs the system of any of the eleventh through seventeenth examples, wherein the second virtual meeting comprises a text chat.

A nineteenth example employs the system of any of the eleventh through eighteenth examples, wherein the second client device and a third client device were previously joined to the second virtual meeting, a third participant associated with the third client device, and wherein the one or more processors are configured to execute further processor-executable instructions stored in the non-transitory computer-readable medium to determine a proximity of the first participant to at least one of the second or third participants; determine a subject matter of a conversation between the second and third participants, the second virtual meeting configured as publicly accessible; determine a common interest between the first participant and the subject matter of the conversation; and provide an indication to the first client device of the common interest and the second virtual meeting.

A twentieth example employs the system of any of the eleventh through nineteenth examples, wherein the one or more processors are configured to execute further processor-executable instructions stored in the non-transitory computer-readable medium to determine subject matter of conversations in a plurality of virtual meetings within the virtual expo, each virtual meeting of the plurality of virtual meetings configured as publicly accessible; identify the second virtual meeting based on a respective subject matter of a conversation of the second virtual meeting and an interest of the first participant; provide an indication to the first client device of the common interest and the second virtual meeting; and provide an indication of a location of at least one of the second or third participants.

A twenty-first example is a non-transitory computer-readable medium that includes processor-executable instructions configured to cause one or more processors to host a virtual meeting comprising a virtual expo; receive, from a first client device associated with a first participant in the virtual expo, a request to enter a meeting with a second participant in the virtual expo; provide, to a second client device associated with the second participant, a notification of the request; receive, from the second client device, an approval of the request; and in response to receipt of the approval, join the first client device to a second virtual meeting.

A twenty-second example employs the non-transitory computer-readable medium of the twenty-first example, further comprising processor-executable instructions configured to cause the one or more processors to create the second virtual meeting; and join the second client device to the second virtual meeting.

A twenty-third example employs the non-transitory computer-readable medium of the twenty-first or twenty-second examples, wherein the second client device and a third client device were previously joined with the second virtual meeting.

A twenty-fourth example employs the non-transitory computer-readable medium of any of the twenty-first through twenty-third examples, further comprising processor-executable instructions configured to cause the one or more processors to determine one or more participants in proximity to the first participant in the virtual expo, the one or more participants including the second participant; determine a common interest associated with the first and second participants; and provide an indication to the first client device of the common interest and the second participant.

A twenty-fifth example employs the non-transitory computer-readable medium of the twenty-fourth example, further comprising processor-executable instructions configured to cause the one or more processors to provide a second indication to the second client device of the common interest and the first participant A twenty-sixth example employs the non-transitory computer-readable medium of any of the twenty-first through twenty-fifth examples, further comprising processor-executable instructions configured to cause the one or more processors to determine subject matter of conversations in a plurality of virtual meetings within the virtual expo, each virtual meeting of the plurality of virtual meetings configured as publicly accessible; identify the second virtual meeting based on a respective subject matter of a conversation of the second virtual meeting and an interest of the first participant; provide an indication to the first client device of the common interest and the second virtual meeting; and provide an indication of a location of at least one of the second or third participants.

A twenty-seventh example employs the non-transitory computer-readable medium of any of the twenty-first through twenty-sixth examples, further comprising processor-executable instructions configured to cause the one or more processors to obtain connection information between the first and second participants from a social media platform; and provide an indication to the first client device of the connection information.

A twenty-eighth example employs the non-transitory computer-readable medium of any of the twenty-first through twenty-seventh examples, wherein the second client device and a third client device were previously joined to the second virtual meeting, a third participant associated with the third client device, and further comprising processor-executable instructions configured to cause the one or more processors to obtain connection information between the first, second, and third participants from a social media platform; and provide one or more indications to the first client device of the connection information.

A twenty-ninth example employs the non-transitory computer-readable medium of any of the twenty-first through twenty-eighth examples, wherein the second virtual meeting comprises a text chat.

A thirtieth example employs the non-transitory computer-readable medium of any of the twenty-first through twenty-ninth examples, wherein the second client device and a third client device were previously joined to the second virtual meeting, a third participant associated with the third client device, and further comprising processor-executable instructions configured to cause the one or more processors to determine a proximity of the first participant to at least one of the second or third participants; determine a subject matter of a conversation between the second and third participants, the second virtual meeting configured as publicly accessible; determine a common interest between the first participant and the subject matter of the conversation; and provide an indication to the first client device of the common interest and the second virtual meeting.

A thirty-first example includes a method that includes joining, by a first client device associated with a first participant, a virtual meeting comprising a virtual expo, the virtual meeting hosted by a video conference provider; providing, by the first client device using a display device, a graphical representation of the virtual expo, the graphical representation including an avatar associated with the first participant; receiving, by the first client device, one or more inputs to move the avatar within the virtual expo; receiving, by the first client device, a selection of a second participant within the virtual expo; transmitting, by the first client device to the video conference provider, a request to join a second virtual meeting with the second participant; receiving, from the video conference provider, information to join the second virtual meeting; and joining by the first client device, the second virtual meeting.

A thirty-second example employs the method of the thirty-first example, further comprising receiving, from the video conference provider, an indication of the second participant having a common interest with the first participant; and displaying an indicator associated with the second participant as a part of the graphical representation of the virtual expo, the indicator identifying the common interest.

A thirty-third example employs the method of the thirty-first or thirty-second examples, further comprising receiving, from the video conference provider, an indication of a conversation including the second participant and a third participant, the conversation having a common interest with the first participant, the conversation configured as publicly accessible; and displaying an indicator associated with the conversation as a part of the graphical representation of the virtual expo, the indicator identifying the common interest.

A thirty-fourth example employs the method of the thirty-third example, further comprising determining a proximity of the first participant to at least one of the second or third participants.

A thirty-fifth example employs the method of any of the thirty-first to thirty-fourth examples, further comprising receiving, from the video conference provider, connection information associated with the first and second participants, the connection information associated with a social media platform and identifying a relationship between the first and second participants; and displaying an indicator associated with the second participant as a part of the graphical representation of the virtual expo, the indicator identifying the relationship between the first and second participants.

A thirty-fifth example employs the method of any of the thirty-first to thirty-fourth examples, wherein the second client device and a third client device were previously joined to the second virtual meeting, a third participant associated with the third client device, and further comprising receiving, from the video conference provider, connection information associated with the first, second, and third participants, the connection information associated with a social media platform and identifying relationships between the first, second, and third participants, and displaying a first indicator associated with the second participant and a second indicator associated with the third participant as a part of the graphical representation of the virtual expo, the second and third indicators identifying the relationships between the first, second, and third participants.

A thirty-sixth example employs the method of any of the thirty-first to thirty-fifth examples, wherein the second virtual meeting comprises a text chat.

A thirty-seventh example is a system that includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to perform the methods of any of the thirty-first to thirty-seventh examples.

A thirty-eighth example is a non-transitory computer-readable medium that includes processor-executable instructions configured to cause one or more processors to perform the methods of any of the thirty-first to thirty-seventh examples.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   creating, by a video conference provider, a virtual expo;
   receiving, by the video conference provider from a first client device associated with a first participant in the virtual expo, a request to interact with a second participant in the virtual expo;
   providing, by the video conference provider to a second client device associated with the second participant, a notification of the request to interact;
   receiving, by the video conference provider from the second client device, an approval of the request; and
   in response to receiving the approval, establishing a first virtual interaction session between the first participant and the second participant.

2. The method of claim 1, wherein the first virtual interaction session is a virtual meeting.

3. The method of claim 1, wherein the first virtual interaction session is a text chat session.

4. The method of claim 1, wherein the virtual expo comprises one or more virtual expo booths, wherein the method further comprises:
   receiving a second request to interact with a virtual booth of the one or more virtual expo booths from the first participant or the second participant; and
   establishing a second virtual interaction session between the first participant, the second participant, and the virtual booth, while maintaining the first virtual interaction session between the first participant and the second participant.

5. The method of claim 1, further comprising:
receiving, by the video conference provider from a third client device, a request to interact with the second participant in the virtual expo;
providing, by the video conference provider to the second client device, a notification of the request to interact with the second participant;
receiving, by the video conference provider from the second client device, an approval of the request; and
in response to receiving the approval, joining, by the video conference provider, the third client device to the first virtual interaction session.

6. The method of claim 1, further comprising:
determining one or more avatars in proximity to a first avatar corresponding to the first participant in the virtual expo, the one or more avatars comprising a second avatar corresponding to a second participant;
determining a common interest associated with the first participant and the second participant; and
providing, to the first client device associated with a first participant, an indication of the common interest and the second participant associated with the second avatar.

7. The method of claim 6, further comprising providing, to the second client device associated with the second participant, a second indication of the common interest and the first participant associated with the first avatar.

8. The method of claim 1, wherein the second client device and a third client device were previously in a virtual interaction session, a third participant associated with the third client device, and further comprising:
determining a proximity of the first participant to at least one of the second participant and the third participant;
determining a subject matter of a conversation between the second participant and the third participant in the virtual interaction session configured as publicly accessible;
determining the subject matter of the conversation is aligned with an interest of the first participant; and
providing, to the first client device associated with the first participant, an indication of the subject matter of the conversation and the virtual interaction session.

9. The method of claim 1, further comprising:
determining a plurality of subject matters of conversations in a plurality of virtual interaction sessions within the virtual expo, each virtual interaction session of the plurality of virtual interaction sessions configured as publicly accessible;
identifying a subject matter of a conversation in a virtual interaction session is aligned with an interest of the first participant, the virtual interaction session comprising the second participant and a third participant;
providing, to the first client device associated with the first participant, an indication of the subject matter and the virtual interaction session; and
providing, to the first client device associated with the first participant, an indication of a location of an avatar corresponding to at least one of the second participant and the third participant.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
create a virtual expo;
receive, from a first client device associated with a first participant in the virtual expo, a request to interact with a second participant in the virtual expo;
provide, to a second client device associated with the second participant, a notification of the request to interact;
receive, from the second client device, an approval of the request; and
in response to receipt of the approval, establish a first virtual interaction session between the first participant and the second participant.

11. The system of claim 10, wherein the virtual expo comprises one or more virtual expo booths, wherein the one or more processors are configured to execute further processor-executable instructions stored in the non-transitory computer-readable medium to:
receive a second request to interact with a virtual booth of the one or more virtual expo booths from the first participant or the second participant; and
establish a second virtual interaction session between the first participant, the second participant, and the virtual booth, while maintaining the first virtual interaction session between the first participant and the second participant.

12. The system of claim 10, wherein the one or more processors are configured to execute further processor-executable instructions stored in the non-transitory computer-readable medium to:
receive, from a third client device, a second request to interact with the second participant in the virtual expo;
provide, to the second client device, a second notification of the second request to interact with the second participant;
receive, from the second client device, a second approval of the second request; and
in response to receiving the second approval, join the third client device to the first virtual interaction session.

13. The system of claim 10, wherein the one or more processors are configured to execute further processor-executable instructions stored in the non-transitory computer-readable medium to:
determine one or more avatars in proximity to a first avatar corresponding to the first participant in the virtual expo, the one or more avatars comprising a second avatar corresponding to the second participant;
determine a common interest associated with the first participant and the second participant; and
provide, to the first client device associated with the first participant, an indication of the common interest and the second participant associated with the second avatar.

14. The system of claim 10, wherein the one or more processors are configured to execute further processor-executable instructions stored in the non-transitory computer-readable medium to:
obtain connection information between the first participant and the second participant from a social media platform; and
provide, to the first client device with the first participant, an indication of the connection information.

15. The system of claim 10, wherein the second client device and a third client device were previously in a virtual interaction session, a third participant associated with the third client device, and wherein the one or more processors are configured to execute further processor-executable instructions stored in the non-transitory computer-readable medium to:
- obtain connection information between the first participant, the second participant, and the third participant from a social media platform; and
- provide, to the first client device, one or more indications of the connection information.

16. A non-transitory computer-readable medium comprising processor-executable instructions configured to cause one or more processors to:
- create a virtual expo;
- receive, from a first client device associated with a first participant in the virtual expo, a request to interact with a second participant in the virtual expo;
- provide, to a second client device associated with the second participant, a notification of the request;
- receive, from the second client device, an approval of the request; and
- in response to receipt of the approval, establish a first virtual interaction session between the first participant and the second participant.

17. The non-transitory computer-readable medium of claim 16, further comprising processor-executable instructions configured to cause the one or more processors to:
- receive a second request to interact with a virtual expo booth of one or more virtual expo booths of the virtual expo from the first participant or the second participant; and
- establish a second virtual interaction session between the first participant, the second participant, and the virtual expo booth, while maintaining the first virtual interaction session between the first participant and the second participant.

18. The non-transitory computer-readable medium of claim 16, further comprising processor-executable instructions configured to cause the one or more processors to:
- determine one or more participants in proximity to the first participant in the virtual expo, the one or more participants comprising the second participant;
- determine a common interest associated with the first participant and the second participant; and
- provide, to the first client device, an indication of the common interest and the second participant.

19. The non-transitory computer-readable medium of claim 16, further comprising processor-executable instructions configured to cause the one or more processors to:
- determine a plurality of subject matters of conversations in a plurality of virtual interaction sessions within the virtual expo, each virtual interaction session of the plurality of virtual interaction sessions configured as publicly accessible;
- identify a subject matter of a conversation in a virtual interaction session aligned with an interest of the first participant, the first virtual interaction session comprising the second participant and a third participant;
- provide, to the first client device, an indication of a common interest and the first virtual interaction session; and
- provide, to the first client device, an indication of a location of an avatar corresponding to at least one of the second or third participants.

20. The non-transitory computer-readable medium of claim 16, further comprising processor-executable instructions configured to cause the one or more processors to:
- obtain connection information between the first participant and the second participant from a social media platform; and
- provide, to the first client device, an indication of the connection information.

* * * * *